United States Patent
Malamal Vadakital et al.

(10) Patent No.: US 10,575,010 B2
(45) Date of Patent: Feb. 25, 2020

(54) APPARATUS, A METHOD AND A COMPUTER PROGRAM FOR IMAGE SEQUENCE CODING AND DECODING

(71) Applicant: Nokia Technologies Oy, Espoo (FI)

(72) Inventors: Vinod Kumar Malamal Vadakital, Tampere (FI); Miska Hannuksela, Tampere (FI)

(73) Assignee: NOKIA TECHNOLOGIES OY, Espoo (FI)

(*) Notice: Subject to any disclaimer, the term of this patent is extended or adjusted under 35 U.S.C. 154(b) by 225 days.

(21) Appl. No.: 15/517,021

(22) PCT Filed: Oct. 8, 2015

(86) PCT No.: PCT/FI2015/050671
§ 371 (c)(1),
(2) Date: Apr. 5, 2017

(87) PCT Pub. No.: WO2016/059290
PCT Pub. Date: Apr. 21, 2016

(65) Prior Publication Data
US 2017/0302949 A1    Oct. 19, 2017

(30) Foreign Application Priority Data
Oct. 14, 2014    (GB) .................. 1418114.3

(51) Int. Cl.
*H04N 19/503* (2014.01)
*H04N 19/70* (2014.01)
(Continued)

(52) U.S. Cl.
CPC ......... *H04N 19/503* (2014.11); *H04N 19/105* (2014.11); *H04N 19/107* (2014.11);
(Continued)

(58) Field of Classification Search
CPC .. H04N 19/105; H04N 19/107; H04N 19/172; H04N 19/46; H04N 19/503; H04N 19/61; H04N 19/70
(Continued)

(56) References Cited

U.S. PATENT DOCUMENTS

| 8,374,240 B1 * | 2/2013 | Namboodiri ......... H04N 19/423 375/240.12 |
| 8,437,408 B2 | 5/2013 | Ogikubo et al. |

(Continued)

FOREIGN PATENT DOCUMENTS

| CN | 101491095 | 7/2009 |
| CN | 103814575 | 5/2014 |
| JP | 2010/074677 A | 4/2010 |

OTHER PUBLICATIONS

Office action received for corresponding Japanese Patent Application No. 2017-519822, dated May 22, 2018, 2 pages of office action and 3 pages of translation available.

(Continued)

*Primary Examiner* — Jonathan R Messmore
(74) *Attorney, Agent, or Firm* — Alston & Bird LLP

(57) ABSTRACT

A method for signaling reference pictures of a picture sequence encoded in a bitstream, the method comprising classifying pictures of the picture sequence into reference pictures and non-reference pictures; providing each reference picture with a unique picture identifier; determining, at least for inter-coded pictures of the picture sequence, all unique combinations of the picture identifier and at least one reference picture identifier, where the at least one reference picture identifier for a particular picture identifies all pictures that may be used as a reference for predicting said particular picture; and assigning intra-coded reference pictures at least with their unique picture identifier and the
(Continued)

inter-coded pictures with their corresponding unique combination of the picture identifier and the at least one reference picture identifier.

19 Claims, 9 Drawing Sheets

(51) Int. Cl.
*H04N 19/46* (2014.01)
*H04N 19/105* (2014.01)
*H04N 19/61* (2014.01)
*H04N 19/107* (2014.01)
*H04N 19/172* (2014.01)

(52) U.S. Cl.
CPC .......... *H04N 19/172* (2014.11); *H04N 19/46* (2014.11); *H04N 19/61* (2014.11); *H04N 19/70* (2014.11)

(58) Field of Classification Search
USPC .................................................. 375/240.12
See application file for complete search history.

(56) References Cited

U.S. PATENT DOCUMENTS

| | | | |
|---|---|---|---|
| 8,693,539 B2 | 4/2014 | Lim et al. | |
| 8,761,255 B2 | 6/2014 | Koo et al. | |
| 9,800,893 B2 | 10/2017 | Lainema et al. | |
| 2007/0121722 A1 | 5/2007 | Martinian et al. | |
| 2013/0034156 A1 | 2/2013 | Song et al. | |
| 2013/0077677 A1 | 3/2013 | Wang et al. | |
| 2013/0077687 A1 | 3/2013 | Wang et al. | |
| 2013/0188882 A1* | 7/2013 | Zhao .................... | H04N 19/503 382/233 |
| 2013/0215975 A1* | 8/2013 | Samuelsson ........... | H04N 19/70 375/240.25 |
| 2013/0259393 A1* | 10/2013 | Deshpande ............... | G06T 9/00 382/232 |
| 2014/0079115 A1* | 3/2014 | Strom .................. | H04N 19/105 375/240.02 |
| 2015/0312580 A1* | 10/2015 | Hannuksela ........... | H04N 19/70 375/240.02 |
| 2016/0241835 A1* | 8/2016 | Ikai ........................ | H04N 19/70 |
| 2017/0142428 A1* | 5/2017 | Lee ...................... | H04N 19/105 |
| 2018/0041762 A1* | 2/2018 | Ikai ...................... | H04N 19/597 |

OTHER PUBLICATIONS

Zhao et al., "Parameterized RPS Models", Joint Collaborative Team on Video Coding (JCT-VC) of ITU-T SG 16 WP 3 and ISO/IEC JTC 1/SC 29/WG 11, JCTVC-I0388, 9th Meeting, Apr. 27-May 7, 2012, pp. 1-6.

Deshpande et al., "AHG21: Reference Picture Set Signaling Method", Joint Collaborative Team on Video Coding (JCT-VC) of ITU-T SG WP3 and ISO/IEC JTC1/SC29/WG11, JCTVC-H0433, 8th Meeting, Feb. 1-10, 2012, pp. 1-7.

ISO/IEC JTC 1/SC 29 Document N14642: "Information technology—MPEG system technologies—Part 12: Image file format", Jul. 7-11, 2014, Sapporo, Japan, 31 pages.

International Search Report and Written Opinion received for corresponding Patent Cooperation Treaty Application No. PCT/FI2015/050671 dated Dec. 2, 2015, 12 pages.

Tian, D et al.: "Sub-sequence video coding for improved temporal scalability", IEEE Int. Symp. on Circuits and Systems, May 23-26, 2005, Kobe, Japan, pp. 6074-6077.

Office Action for Chinese Application No. 201580065170 dated Apr. 29, 2019.

Office Action for European Application No. 15851432.3 dated Jul. 4, 2019.

Office Action for Chinese Application No. 201580065170 dated Dec. 4, 2019.

* cited by examiner

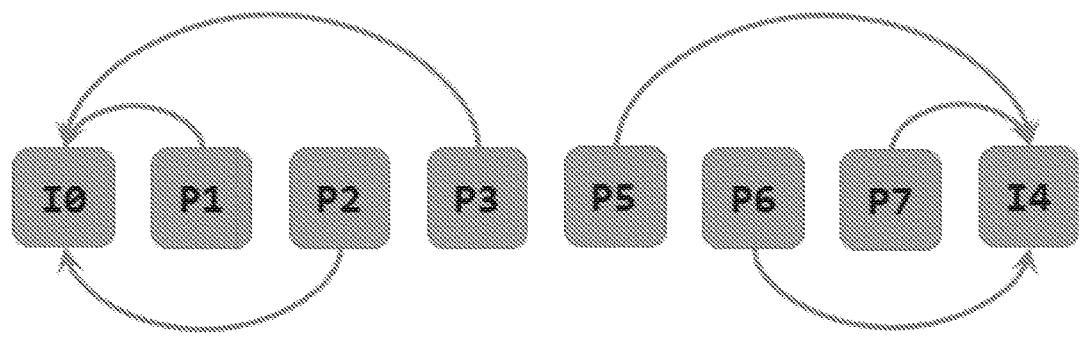
Fig. 7a
Fig. 7b
| Sample Number | Sample Type | sample_id | reference_sample_id lists |
|---|---|---|---|
| 0 | I | 101 | 101 |
| 1 | P | 0 | 101 |
| 2 | P | 0 | 101 |
| 3 | P | 0 | 101 |
| 4 | I | 102 | 102 |
| 5 | P | 0 | 102 |
| 6 | P | 0 | 102 |
| 7 | P | 0 | 102 |
Fig. 8

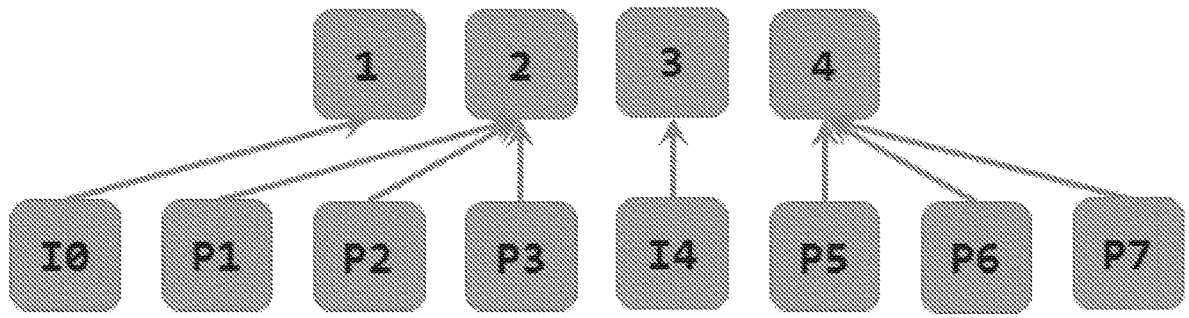
Fig. 9a
Fig. 9b
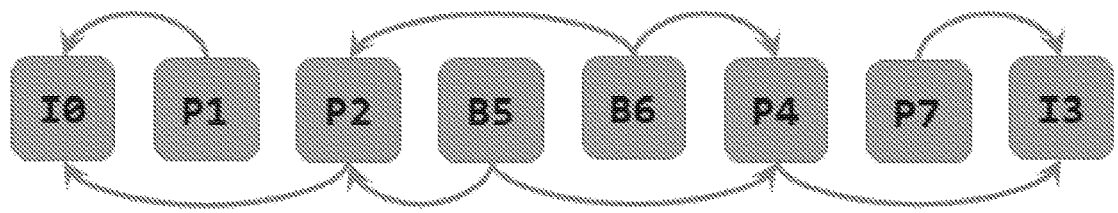
Fig. 10a
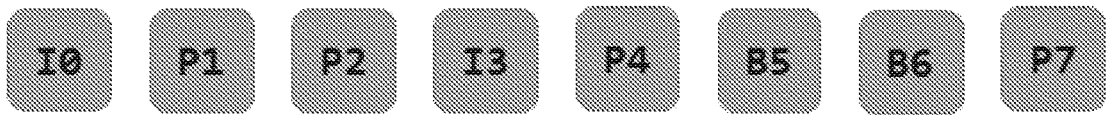
Fig. 10b

| Sample Number | Sample Type | sample_id | reference_sample_id lists |
|---|---|---|---|
| 0 | I | 101 | 101 |
| 1 | P | 0 | 101 |
| 2 | P | 102 | 101 |
| 3 | I | 103 | 103 |
| 4 | P | 104 | 103 |
| 5 | B | 0 | [102, 104] |
| 6 | B | 0 | [102, 104] |
| 7 | P | 0 | 103 |

| Idx | sample_id | reference_sample_id lists |
|---|---|---|
| 1 | 101 | 101 |
| 2 | 0 | 101 |
| 3 | 102 | 101 |
| 4 | 103 | 103 |
| 5 | 104 | 103 |
| 6 | 0 | [102, 104] |
| 7 | 0 | 103 |

APPARATUS, A METHOD AND A COMPUTER PROGRAM FOR IMAGE SEQUENCE CODING AND DECODING

RELATED APPLICATION

This application was originally filed as Patent Cooperation Treaty Application No. PCT/FI2015/050671 filed Oct. 8, 2015 which claims priority benefit to GB patent application Ser. No. 1418114.3 filed Oct. 14, 2014.

TECHNICAL FIELD

The present invention relates to an apparatus, a method and a computer program for image sequence coding and decoding.

BACKGROUND

Video codec consists of an encoder that transforms the images of the input video into a compressed representation suited for storage/transmission and a decoder that can uncompress the compressed video representation back into a viewable form. Image sequences can be compressed either as sequences of still pictures coded with spatial prediction means or inter pictures coded with spatial and temporal prediction means. Image sequences with random access and support for editing individual pictures have been traditionally enabled by representing the sequence as a series of independently coded intra pictures. Such formats include, for example, Motion JPEG, animated GIF and the Intra profiles of H.264.

If a sequence of images is represented as a series of still pictures, the coding efficiency is typically poor and the file size requirement for a high resolution sequence can become massive. In order to access a predicted picture, the decoder needs to conclude which reference pictures are required to be decoded first. The delay may be significantly reduced, if only those pictures that are used as reference are decoded rather than decoding all pictures starting from the previous IDR picture or alike. However, in the known methods, random access to any sample may require decoding all reference pictures starting from the previous IDR picture or alike, as concluding which subset of reference pictures are required to be decoded may not be easily possible.

Therefore there is a need for an improved method for identifying pictures that are required to be decoded in order to decode a desired random-accessed picture correctly.

SUMMARY

A method according to a first embodiment comprises a method for signaling reference pictures of a picture sequence encoded in a bitstream, the method comprising
classifying pictures of the picture sequence into reference pictures and non-reference pictures;
providing each reference picture with a unique picture identifier;
determining, at least for inter-coded pictures of the picture sequence, all unique combinations of the picture identifier and at least one reference picture identifier, where the at least one reference picture identifier for a particular picture identifies all pictures that may be used as a reference for predicting said particular picture; and
assigning intra-coded reference pictures at least with their unique picture identifier and the inter-coded pictures with their corresponding unique combination of the picture identifier and the at least one reference picture identifier.

According to an embodiment, the method further comprises
assigning for the intra-coded reference pictures with reference picture identifiers having the same value as their unique picture identifiers.

According to an embodiment, the method further comprises
providing each non-reference picture with a common picture identifier.

According to an embodiment, the unique picture identifier for each reference picture is a positive non-zero integer and the common picture identifier for the non-reference pictures is zero.

According to an embodiment, the method further comprises
assigning an index for each unique combination of the picture identifier and the at least one reference picture identifier; and
mapping the pictures of the picture sequence to an index corresponding their unique combination of the picture identifier and the at least one reference picture identifier.

According to an embodiment, the method further comprises
indicating said mapping in a container file that also comprises or refers to the bitstream.

According to an embodiment, the container file complies with ISO Base Media File Format (ISOBMFF), the container file comprising a track that logically comprises samples, and a sample of the track comprises a picture, the method comprising
including a unique combination of the picture identifier and at least one reference picture identifier as a sample group description entry in the container file, sample group description entry being assigned with the respective index; and
including, in the container file, an indication within a sample-to-group data structure that a picture is mapped to the respective index of the sample group description entry.

A second embodiment relates to an apparatus comprising at least one processor and at least one memory, said at least one memory stored with code thereon, which when executed by said at least one processor, causes the apparatus to perform at least
classifying pictures of a picture sequence into reference pictures and non-reference pictures;
providing each reference picture with a unique picture identifier;
determining, at least for inter-coded pictures of the picture sequence, all unique combinations of the picture identifier and at least one reference picture identifier, where the at least one reference picture identifier for a particular picture identifies all pictures that may be used as a reference for predicting said particular picture;
assigning intra-coded reference pictures at least with their unique picture identifier and the inter-coded pictures with their corresponding unique combination of the picture identifier and the at least one reference picture identifier.

A third embodiment relates to a method comprising:
receiving signaling comprising indications for reference pictures required for decoding a picture of a picture sequence;

determining an indication for at least a unique picture identifier for an intra-coded reference picture and a unique combination of a picture identifier and at least one reference picture identifier for an inter-coded picture; and determining from the at least one reference picture identifier for a particular inter-coded picture all pictures referred to by said particular inter-coded picture.

According to an embodiment, the method further comprises obtaining a request for random-accessing said particular inter-coded picture;

decoding said all pictures referred to by said particular inter-coded picture;

decoding said particular inter-coded picture.

A fourth embodiment relates to an apparatus comprising at least one processor and at least one memory, said at least one memory stored with code thereon, which when executed by said at least one processor, causes the apparatus to perform at least receiving signaling comprising indications for reference pictures required for decoding a picture of a picture sequence;

determining an indication for at least a unique picture identifier for an intra-coded reference picture and a unique combination of a picture identifier and at least one reference picture identifier for an inter-coded picture; and determining from the at least one reference picture identifier for a particular inter-coded picture all samples referred to by said particular inter-coded picture

BRIEF DESCRIPTION OF THE DRAWINGS

For better understanding of the present invention, reference will now be made by way of example to the accompanying drawings in which:

FIGS. 7a and 7b show an example of a coded image sequence in presentation order and in decoding order;

FIG. 8 shows a table listing samples of FIGS. 7a and 7b according to their sample_id, and the list of reference_sample_id;

FIG. 9a shows a list of unique sample_id-reference_sample_id combinations of samples of FIGS. 7a and 7b;

FIG. 9b shows mapping of the samples to group description index in the sample to group box according to an embodiment of the invention;

FIGS. 10a and 10b show another example of a coded image sequence in presentation order and in decoding order;

DETAILED DESCRIPTION OF SOME EXAMPLE EMBODIMENTS

Figure 1:
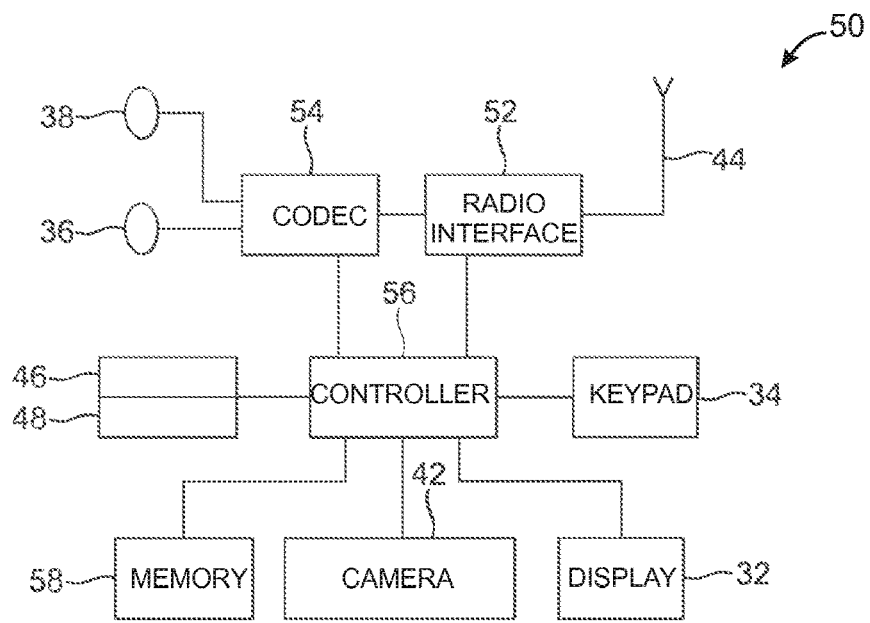
FIG. 1 shows schematically an electronic device employing some embodiments of the invention.
Figure 2:
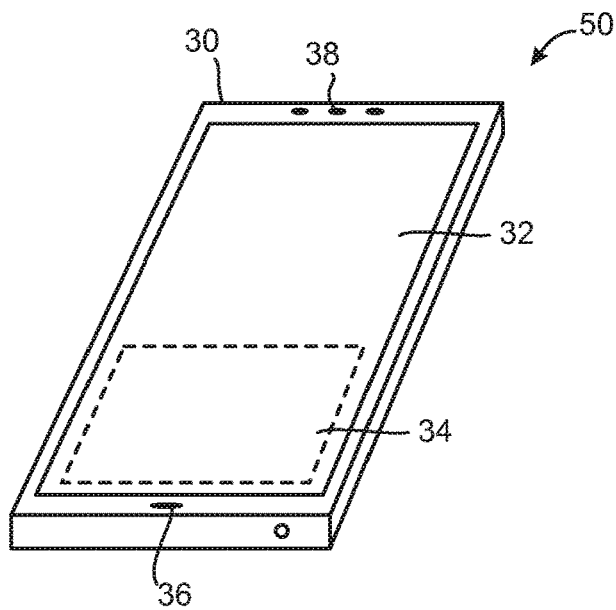
FIG. 2 shows schematically a user equipment suitable for employing some embodiments of the invention.

The following describes in further detail suitable apparatus and possible mechanisms for identifying pictures that are required to be decoded in order to decode a desired random-accessed picture correctly. In this regard reference is first made to FIGS. 1 and 2, where FIG. 1 shows a block diagram of a video coding system according to an example embodiment as a schematic block diagram of an exemplary apparatus or electronic device 50, which may incorporate a codec according to an embodiment of the invention. FIG. 2 shows a layout of an apparatus according to an example embodiment. The elements of FIGS. 1 and 2 will be explained next.

The electronic device 50 may for example be a mobile terminal or user equipment of a wireless communication system. However, it would be appreciated that embodiments of the invention may be implemented within any electronic device or apparatus which may require encoding and decoding or encoding or decoding video images.

The apparatus 50 may comprise a housing 30 for incorporating and protecting the device. The apparatus 50 further may comprise a display 32 in the form of a liquid crystal display. In other embodiments of the invention the display may be any suitable display technology suitable to display an image or video. The apparatus 50 may further comprise a keypad 34. In other embodiments of the invention any suitable data or user interface mechanism may be employed. For example the user interface may be implemented as a virtual keyboard or data entry system as part of a touch-sensitive display.

The apparatus may comprise a microphone 36 or any suitable audio input which may be a digital or analogue signal input. The apparatus 50 may further comprise an audio output device which in embodiments of the invention may be any one of: an earpiece 38, speaker, or an analogue audio or digital audio output connection. The apparatus 50 may also comprise a battery 40 (or in other embodiments of the invention the device may be powered by any suitable mobile energy device such as solar cell, fuel cell or clockwork generator). The apparatus may further comprise a camera 42 capable of recording or capturing images and/or video. The apparatus 50 may further comprise an infrared port for short range line of sight communication to other devices. In other embodiments the apparatus 50 may further comprise any suitable short range communication solution such as for example a Bluetooth wireless connection or a USB/firewire wired connection.

The apparatus 50 may comprise a controller 56 or processor for controlling the apparatus 50. The controller 56 may be connected to memory 58 which in embodiments of the invention may store both data in the form of image and audio data and/or may also store instructions for implementation on the controller 56. The controller 56 may further be connected to codec circuitry 54 suitable for carrying out coding and decoding of audio and/or video data or assisting in coding and decoding carried out by the controller.

The apparatus 50 may further comprise a card reader 48 and a smart card 46, for example a UICC and UICC reader for providing user information and being suitable for providing authentication information for authentication and authorization of the user at a network.

The apparatus 50 may comprise radio interface circuitry 52 connected to the controller and suitable for generating wireless communication signals for example for communication with a cellular communications network, a wireless communications system or a wireless local area network. The apparatus 50 may further comprise an antenna 44 connected to the radio interface circuitry 52 for transmitting radio frequency signals generated at the radio interface circuitry 52 to other apparatus(es) and for receiving radio frequency signals from other apparatus(es).

The apparatus 50 may comprise a camera capable of recording or detecting individual frames which are then passed to the codec 54 or the controller for processing. The apparatus may receive the video image data for processing from another device prior to transmission and/or storage. The apparatus 50 may also receive either wirelessly or by a wired connection the image for coding/decoding.

Figure 3:
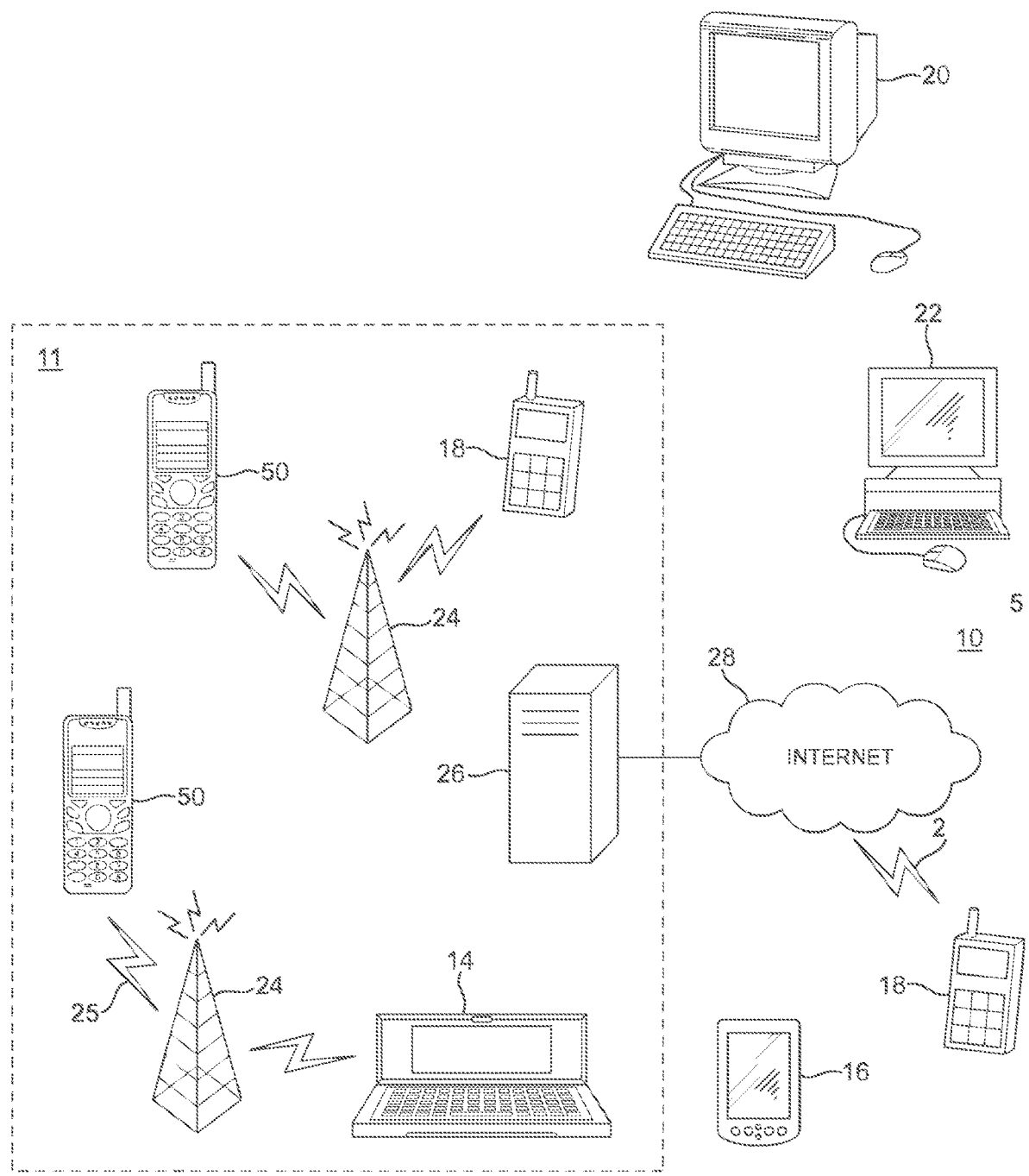
FIG. 3 further shows schematically electronic devices employing embodiments of the invention connected using wireless and wired network connections.

With respect to FIG. 3, an example of a system within which embodiments of the present invention can be utilized is shown. The system 10 comprises multiple communication devices which can communicate through one or more networks. The system 10 may comprise any combination of wired or wireless networks including, but not limited to a wireless cellular telephone network (such as a GSM, UMTS, CDMA network etc), a wireless local area network (WLAN) such as defined by any of the IEEE 802.x standards, a Bluetooth personal area network, an Ethernet local area network, a token ring local area network, a wide area network, and the Internet.

The system 10 may include both wired and wireless communication devices or apparatus 50 suitable for implementing embodiments of the invention.

For example, the system shown in FIG. 3 shows a mobile telephone network 11 and a representation of the internet 28. Connectivity to the internet 28 may include, but is not limited to, long range wireless connections, short range wireless connections, and various wired connections including, but not limited to, telephone lines, cable lines, power lines, and similar communication pathways.

The example communication devices shown in the system 10 may include, but are not limited to, an electronic device or apparatus 50, a combination of a personal digital assistant (PDA) and a mobile telephone 14, a PDA 16, an integrated messaging device (IMD) 18, a desktop computer 20, a notebook computer 22. The apparatus 50 may be stationary or mobile when carried by an individual who is moving. The apparatus 50 may also be located in a mode of transport including, but not limited to, a car, a truck, a taxi, a bus, a train, a boat, an airplane, a bicycle, a motorcycle or any similar suitable mode of transport.

The embodiments may also be implemented in a set-top box; i.e. a digital TV receiver, which may/may not have a display or wireless capabilities, in tablets or (laptop) personal computers (PC), which have hardware or software or combination of the encoder/decoder implementations, in various operating systems, and in chipsets, processors, DSPs and/or embedded systems offering hardware/software based coding.

Some or further apparatus may send and receive calls and messages and communicate with service providers through a wireless connection 25 to a base station 24. The base station 24 may be connected to a network server 26 that allows communication between the mobile telephone network 11 and the internet 28. The system may include additional communication devices and communication devices of various types.

The communication devices may communicate using various transmission technologies including, but not limited to, code division multiple access (CDMA), global systems for mobile communications (GSM), universal mobile telecommunications system (UMTS), time divisional multiple access (TDMA), frequency division multiple access (FDMA), transmission control protocol-internet protocol (TCP-IP), short messaging service (SMS), multimedia messaging service (MMS), email, instant messaging service (IMS), Bluetooth, IEEE 802.11 and any similar wireless communication technology. A communications device involved in implementing various embodiments of the present invention may communicate using various media including, but not limited to, radio, infrared, laser, cable connections, and any suitable connection.

Video codec consists of an encoder that transforms the input video into a compressed representation suited for storage/transmission and a decoder that can uncompress the compressed video representation back into a viewable form. Typically encoder discards some information in the original video sequence in order to represent the video in a more compact form (that is, at lower bitrate). A video encoder may also be separate from a video decoder. In other words, encoding and decoding may performed by separate entities and either encoding or decoding may be performed.

Typical hybrid video codecs, for example many encoder implementations of ITU-T H.263 and H.264, encode the video information in two phases. Firstly pixel values in a certain picture area (or "block") are predicted for example by motion compensation means (finding and indicating an area in one of the previously coded video frames that corresponds closely to the block being coded) or by spatial means (using the pixel values around the block to be coded in a specified manner). Secondly the prediction error, i.e. the difference between the predicted block of pixels and the original block of pixels, is coded. This is typically done by transforming the difference in pixel values using a specified transform (e.g. Discrete Cosine Transform (DCT) or a variant of it), quantizing the coefficients and entropy coding the quantized coefficients. By varying the fidelity of the quantization process, encoder can control the balance between the accuracy of the pixel representation (picture quality) and size of the resulting coded video representation (file size or transmission bitrate).

Inter prediction, which may also be referred to as temporal prediction, motion compensation, or motion-compensated prediction, reduces temporal redundancy. In inter prediction the sources of prediction are previously decoded pictures. Intra prediction utilizes the fact that adjacent pixels within the same picture are likely to be correlated. Intra prediction can be performed in spatial or transform domain, i.e., either sample values or transform coefficients can be predicted. Intra prediction is typically exploited in intra coding, where no inter prediction is applied.

One outcome of the coding procedure is a set of coding parameters, such as motion vectors and quantized transform coefficients. Many parameters can be entropy-coded more efficiently if they are predicted first from spatially or temporally neighboring parameters. For example, a motion vector may be predicted from spatially adjacent motion vectors and only the difference relative to the motion vector predictor may be coded. Prediction of coding parameters and intra prediction may be collectively referred to as in-picture prediction.

Figure 4:
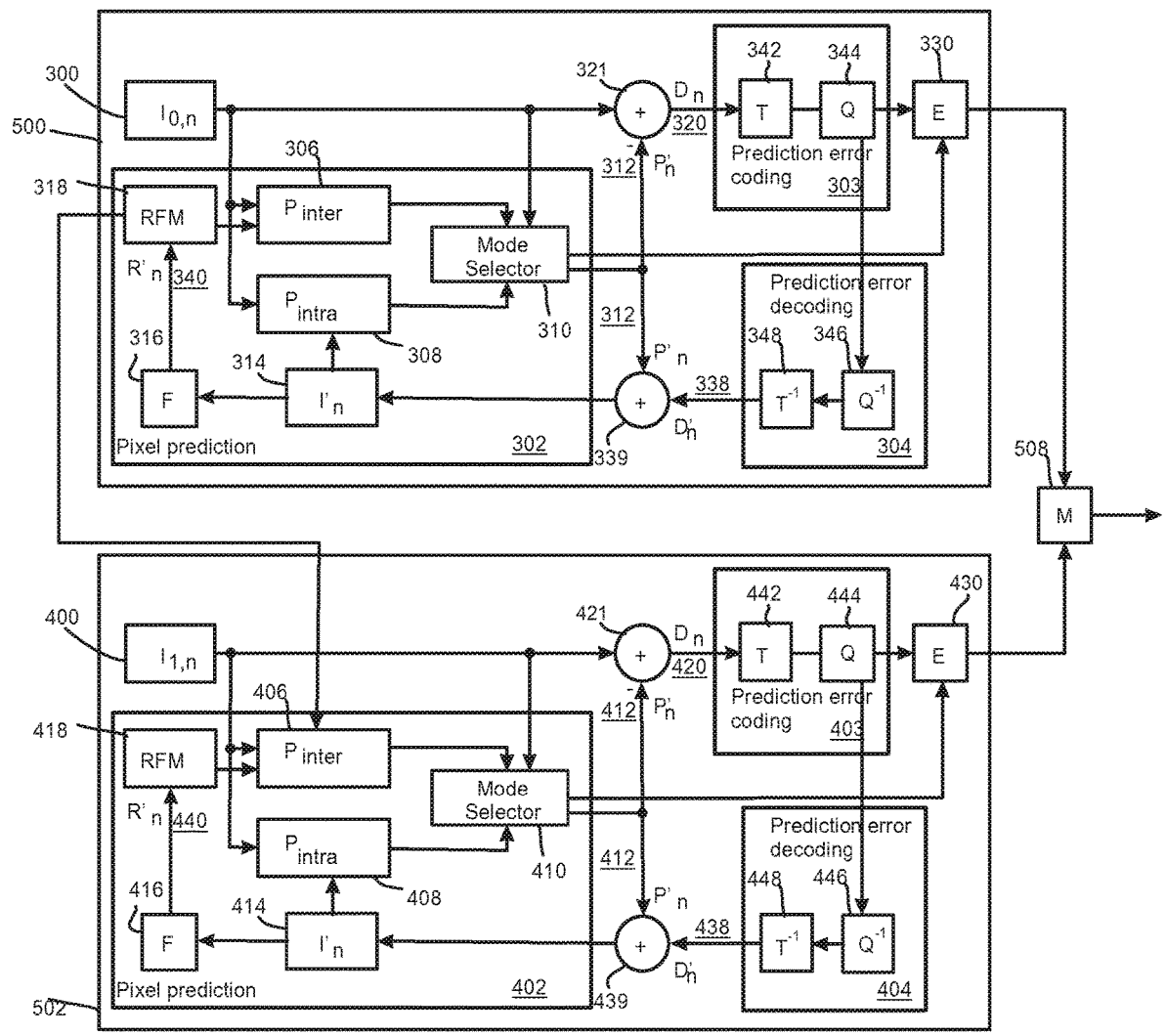
FIG. 4 shows schematically an encoder suitable for implementing some embodiments of the invention.

FIG. 4 shows a block diagram of a video encoder suitable for employing embodiments of the invention. FIG. 4 presents an encoder for two layers, but it would be appreciated that presented encoder could be similarly extended to encode more than two layers. FIG. 4 illustrates an embodiment of a video encoder comprising a first encoder section 500 for a base layer and a second encoder section 502 for an enhancement layer. Each of the first encoder section 500 and the second encoder section 502 may comprise similar elements for encoding incoming pictures. The encoder sections 500, 502 may comprise a pixel predictor 302, 402, prediction error encoder 303, 403 and prediction error decoder 304, 404. FIG. 4 also shows an embodiment of the pixel predictor 302, 402 as comprising an inter-predictor 306, 406, an intra-predictor 308, 408, a mode selector 310, 410, a filter 316, 416, and a reference frame memory 318, 418. The pixel predictor 302 of the first encoder section 500 receives 300 base layer images of a video stream to be encoded at both the inter-predictor 306 (which determines the difference between the image and a motion compensated reference frame 318) and the intra-predictor 308 (which determines a prediction for an image block based only on the already processed parts of current frame or picture). The output of both the inter-predictor and the intra-predictor are passed to the mode selector 310. The intra-predictor 308 may have more than one intra-prediction modes. Hence, each mode may perform the intra-prediction and provide the predicted signal to the mode selector 310. The mode selector 310 also receives a copy of the base layer picture 300. Correspondingly, the pixel predictor 402 of the second encoder section 502 receives 400 enhancement layer images of a video stream to be encoded at both the inter-predictor 406 (which determines the difference between the image and a motion compensated reference frame 418) and the intra-predictor 408 (which determines a prediction for an image block based only on the already processed parts of current frame or picture). The output of both the inter-predictor and the intra-predictor are passed to the mode selector 410. The intra-predictor 408 may have more than one intra-prediction modes. Hence, each mode may perform the intra-prediction and provide the predicted signal to the mode selector 410. The mode selector 410 also receives a copy of the enhancement layer picture 400.

Depending on which encoding mode is selected to encode the current block, the output of the inter-predictor 306, 406 or the output of one of the optional intra-predictor modes or the output of a surface encoder within the mode selector is passed to the output of the mode selector 310, 410. The output of the mode selector is passed to a first summing device 321, 421. The first summing device may subtract the output of the pixel predictor 302, 402 from the base layer picture 300/enhancement layer picture 400 to produce a first prediction error signal 320, 420 which is input to the prediction error encoder 303, 403.

The pixel predictor 302, 402 further receives from a preliminary reconstructor 339, 439 the combination of the prediction representation of the image block 312, 412 and the output 338, 438 of the prediction error decoder 304, 404. The preliminary reconstructed image 314, 414 may be passed to the intra-predictor 308, 408 and to a filter 316, 416. The filter 316, 416 receiving the preliminary representation may filter the preliminary representation and output a final reconstructed image 340, 440 which may be saved in a reference frame memory 318, 418. The reference frame memory 318 may be connected to the inter-predictor 306 to be used as the reference image against which a future base layer picture 300 is compared in inter-prediction operations. Subject to the base layer being selected and indicated to be source for inter-layer sample prediction and/or inter-layer motion information prediction of the enhancement layer according to some embodiments, the reference frame memory 318 may also be connected to the inter-predictor 406 to be used as the reference image against which a future enhancement layer pictures 400 is compared in inter-prediction operations. Moreover, the reference frame memory 418 may be connected to the inter-predictor 406 to be used as the reference image against which a future enhancement layer picture 400 is compared in inter-prediction operations.

Filtering parameters from the filter 316 of the first encoder section 500 may be provided to the second encoder section 502 subject to the base layer being selected and indicated to be source for predicting the filtering parameters of the enhancement layer according to some embodiments.

The prediction error encoder 303, 403 comprises a transform unit 342, 442 and a quantizer 344, 444. The transform unit 342, 442 transforms the first prediction error signal 320, 420 to a transform domain. The transform is, for example, the DCT transform. The quantizer 344, 444 quantizes the transform domain signal, e.g. the DCT coefficients, to form quantized coefficients.

The prediction error decoder 304, 404 receives the output from the prediction error encoder 303, 403 and performs the opposite processes of the prediction error encoder 303, 403 to produce a decoded prediction error signal 338, 438 which, when combined with the prediction representation of the image block 312, 412 at the second summing device 339, 439, produces the preliminary reconstructed image 314, 414. The prediction error decoder may be considered to comprise a dequantizer 361, 461, which dequantizes the quantized coefficient values, e.g. DCT coefficients, to reconstruct the transform signal and an inverse transformation unit 363, 463, which performs the inverse transformation to the reconstructed transform signal wherein the output of the inverse transformation unit 363, 463 contains reconstructed block(s). The prediction error decoder may also comprise a block filter which may filter the reconstructed block(s) according to further decoded information and filter parameters.

The entropy encoder 330, 430 receives the output of the prediction error encoder 303, 403 and may perform a suitable entropy encoding/variable length encoding on the signal to provide error detection and correction capability. The outputs of the entropy encoders 330, 430 may be inserted into a bitstream e.g. by a multiplexer 508.

The H.264/AVC standard was developed by the Joint Video Team (JVT) of the Video Coding Experts Group (VCEG) of the Telecommunications Standardization Sector of International Telecommunication Union (ITU-T) and the Moving Picture Experts Group (MPEG) of International Organisation for Standardization (ISO)/International Electrotechnical Commission (IEC). The H.264/AVC standard is published by both parent standardization organizations, and it is referred to as ITU-T Recommendation H.264 and ISO/IEC International Standard 14496-10, also known as MPEG-4 Part 10 Advanced Video Coding (AVC). There have been multiple versions of the H.264/AVC standard, integrating new extensions or features to the specification. These extensions include Scalable Video Coding (SVC) and Multiview Video Coding (MVC).

The High Efficiency Video Coding (H.265/HEVC) standard was developed by the Joint Collaborative Team— Video Coding (JCT-VC) of VCEG and MPEG. Currently, the H.265/HEVC standard is undergoing the final approval ballots in ISO/IEC and ITU-T. The standard has been published by both parent standardization organizations, and it is referred to as ITU-T Recommendation H.265 and ISO/IEC International Standard 23008-2, also known as MPEG-H Part 2 High Efficiency Video Coding (HEVC). The development of scalable, multiview, three-dimensional, and range extensions of HEVC have been finished and these extensions will be published as part of Edition 2 of H.265/HEVC. There are currently ongoing standardization projects to develop further extensions to H.265/HEVC, including three-dimensional, and screen content coding extensions.

Some key definitions, bitstream and coding structures, and concepts of H.264/AVC and HEVC are described in this section as an example of a video encoder, decoder, encoding method, decoding method, and a bitstream structure, wherein the embodiments may be implemented. Some of the key definitions, bitstream and coding structures, and concepts of H.264/AVC are the same as in HEVC standard—hence, they are described below jointly. The embodiments of the invention are not limited to H.264/AVC or HEVC, but rather the description is given for one possible basis on top of which the invention may be partly or fully realized.

Similarly to many earlier video coding standards, the bitstream syntax and semantics as well as the decoding process for error-free bitstreams are specified in H.264/AVC and HEVC. The encoding process is not specified, but encoders generate conforming bitstreams. Bitstream and decoder conformance can be verified with the Hypothetical Reference Decoder (HRD). The standards contain coding tools that help in coping with transmission errors and losses, but the use of the tools in encoding is optional and no decoding process has been specified for erroneous bitstreams.

In the description of existing standards as well as in the description of example embodiments, a syntax element may be defined as an element of data represented in the bitstream. A syntax structure may be defined as zero or more syntax elements present together in the bitstream in a specified order.

A profile may be defined as a subset of the entire bitstream syntax that is specified by a decoding/coding standard or specification. Within the bounds imposed by the syntax of a given profile it is still possible to require a very large variation in the performance of encoders and decoders depending upon the values taken by syntax elements in the bitstream such as the specified size of the decoded pictures. In many applications, it might be neither practical nor economic to implement a decoder capable of dealing with all hypothetical uses of the syntax within a particular profile. In order to deal with this issue, levels may be used. A level may be defined as a specified set of constraints imposed on values of the syntax elements in the bitstream and variables specified in a decoding/coding standard or specification. These constraints may be simple limits on values. Alternatively or in addition, they may take the form of constraints on arithmetic combinations of values (e.g., picture width multiplied by picture height multiplied by number of pictures decoded per second). Other means for specifying constraints for levels may also be used. Some of the constraints specified in a level may for example relate to the maximum picture size, maximum bitrate and maximum data rate in terms of coding units, such as macroblocks, per a time period, such as a second. The same set of levels may be defined for all profiles. It may be preferable for example to increase interoperability of terminals implementing different profiles that some or all aspects of the definition of each level may be common across different profiles.

The elementary unit for the input to an H.264/AVC or HEVC encoder and the output of an H.264/AVC or HEVC decoder, respectively, is a picture. A picture given as an input to an encoder may also referred to as a source picture, and a picture decoded by a decoded may be referred to as a decoded picture.

The source and decoded pictures are each comprised of one or more sample arrays, such as one of the following sets of sample arrays:
  Luma (Y) only (monochrome).
  Luma and two chroma (YCbCr or YCgCo).
  Green, Blue and Red (GBR, also known as RGB).
  Arrays representing other unspecified monochrome or tri-stimulus color samplings (for example, YZX, also known as XYZ).

In the following, these arrays may be referred to as luma (or L or Y) and chroma, where the two chroma arrays may be referred to as Cb and Cr; regardless of the actual color representation method in use. The actual color representation method in use can be indicated e.g. in a coded bitstream e.g. using the Video Usability Information (VUI) syntax of H.264/AVC and/or HEVC. A component may be defined as an array or single sample from one of the three sample arrays arrays (luma and two chroma) or the array or a single sample of the array that compose a picture in monochrome format.

In H.264/AVC and HEVC, a picture may either be a frame or a field. A frame comprises a matrix of luma samples and possibly the corresponding chroma samples. A field is a set of alternate sample rows of a frame and may be used as encoder input, when the source signal is interlaced. Chroma sample arrays may be absent (and hence monochrome sampling may be in use) or chroma sample arrays may be subsampled when compared to luma sample arrays. Chroma formats may be summarized as follows:
  In monochrome sampling there is only one sample array, which may be nominally considered the luma array.
  In 4:2:0 sampling, each of the two chroma arrays has half the height and half the width of the luma array.
  In 4:2:2 sampling, each of the two chroma arrays has the same height and half the width of the luma array.
  In 4:4:4 sampling when no separate color planes are in use, each of the two chroma arrays has the same height and width as the luma array.

In H.264/AVC and HEVC, it is possible to code sample arrays as separate color planes into the bitstream and respectively decode separately coded color planes from the bitstream. When separate color planes are in use, each one of them is separately processed (by the encoder and/or the decoder) as a picture with monochrome sampling.

When chroma subsampling is in use (e.g. 4:2:0 or 4:2:2 chroma sampling), the location of chroma samples with respect to luma samples may be determined in the encoder side (e.g. as pre-processing step or as part of encoding). The chroma sample positions with respect to luma sample positions may be pre-defined for example in a coding standard, such as H.264/AVC or HEVC, or may be indicated in the bitstream for example as part of VUI of H.264/AVC or HEVC.

A partitioning may be defined as a division of a set into subsets such that each element of the set is in exactly one of the subsets.

In H.264/AVC, a macroblock is a 16×16 block of luma samples and the corresponding blocks of chroma samples. For example, in the 4:2:0 sampling pattern, a macroblock contains one 8×8 block of chroma samples per each chroma component. In H.264/AVC, a picture is partitioned to one or more slice groups, and a slice group contains one or more slices. In H.264/AVC, a slice consists of an integer number of macroblocks ordered consecutively in the raster scan within a particular slice group.

When describing the operation of HEVC encoding and/or decoding, the following terms may be used. A coding block may be defined as an N×N block of samples for some value of N such that the division of a coding tree block into coding blocks is a partitioning. A coding tree block (CTB) may be defined as an N×N block of samples for some value of N such that the division of a component into coding tree blocks is a partitioning. A coding tree unit (CTU) may be defined as a coding tree block of luma samples, two corresponding coding tree blocks of chroma samples of a picture that has three sample arrays, or a coding tree block of samples of a monochrome picture or a picture that is coded using three separate color planes and syntax structures used to code the samples. A coding unit (CU) may be defined as a coding block of luma samples, two corresponding coding blocks of chroma samples of a picture that has three sample arrays, or a coding block of samples of a monochrome picture or a picture that is coded using three separate color planes and syntax structures used to code the samples.

In some video codecs, such as High Efficiency Video Coding (HEVC) codec, video pictures are divided into coding units (CU) covering the area of the picture. A CU consists of one or more prediction units (PU) defining the prediction process for the samples within the CU and one or more transform units (TU) defining the prediction error coding process for the samples in the said CU. Typically, a CU consists of a square block of samples with a size selectable from a predefined set of possible CU sizes. A CU with the maximum allowed size may be named as LCU (largest coding unit) or coding tree unit (CTU) and the video picture is divided into non-overlapping LCUs. An LCU can be further split into a combination of smaller CUs, e.g. by recursively splitting the LCU and resultant CUs. Each resulting CU typically has at least one PU and at least one TU associated with it. Each PU and TU can be further split into smaller PUs and TUs in order to increase granularity of the prediction and prediction error coding processes, respectively. Each PU has prediction information associated with it defining what kind of a prediction is to be applied for the pixels within that PU (e.g. motion vector information for inter predicted PUs and intra prediction directionality information for intra predicted PUs).

In the HEVC standard, a picture can be partitioned in tiles, which are rectangular and contain an integer number of LCUs. In the HEVC standard, the partitioning to tiles forms a regular grid, where heights and widths of tiles differ from each other by one LCU at the maximum. In HEVC, a slice is defined to be an integer number of coding tree units contained in one independent slice segment and all subsequent dependent slice segments (if any) that precede the next independent slice segment (if any) within the same access unit. In the HEVC standard, a slice segment is defined to be an integer number of coding tree units ordered consecutively in the tile scan and contained in a single NAL unit. The division of each picture into slice segments is a partitioning. In the HEVC standard, an independent slice segment is defined to be a slice segment for which the values of the syntax elements of the slice segment header are not inferred from the values for a preceding slice segment, and a dependent slice segment is defined to be a slice segment for which the values of some syntax elements of the slice segment header are inferred from the values for the preceding independent slice segment in decoding order. In the HEVC standard, a slice header is defined to be the slice segment header of the independent slice segment that is a current slice segment or is the independent slice segment that precedes a current dependent slice segment, and a slice segment header is defined to be a part of a coded slice segment containing the data elements pertaining to the first or all coding tree units represented in the slice segment. The CUs are scanned in the raster scan order of LCUs within tiles or within a picture, if tiles are not in use. Within an LCU, the CUs have a specific scan order.

The decoder reconstructs the output video by applying prediction means similar to the encoder to form a predicted representation of the pixel blocks (using the motion or spatial information created by the encoder and stored in the compressed representation) and prediction error decoding (inverse operation of the prediction error coding recovering the quantized prediction error signal in spatial pixel domain). After applying prediction and prediction error decoding means the decoder sums up the prediction and prediction error signals (pixel values) to form the output video frame. The decoder (and encoder) can also apply additional filtering means to improve the quality of the output video before passing it for display and/or storing it as prediction reference for the forthcoming frames in the video sequence. The filtering may for example include one more of the following: deblocking, sample adaptive offset (SAO), and/or adaptive loop filtering (ALF).

In typical video codecs the motion information is indicated with motion vectors associated with each motion compensated image block. Each of these motion vectors represents the displacement of the image block in the picture to be coded (in the encoder side) or decoded (in the decoder side) and the prediction source block in one of the previously coded or decoded pictures. In order to represent motion vectors efficiently those are typically coded differentially with respect to block specific predicted motion vectors. In typical video codecs the predicted motion vectors are created in a predefined way, for example calculating the median of the encoded or decoded motion vectors of the adjacent blocks. Another way to create motion vector predictions is to generate a list of candidate predictions from adjacent blocks and/or co-located blocks in temporal reference pictures and signalling the chosen candidate as the motion vector predictor. In addition to predicting the motion vector values, it can be predicted which reference picture(s) are used for motion-compensated prediction and this prediction information may be represented for example by a reference index of previously coded/decoded picture. The reference index is typically predicted from adjacent blocks and/or or co-located blocks in temporal reference picture. Moreover, typical high efficiency video codecs employ an additional motion information coding/decoding mechanism, often called merging/merge mode, where all the motion field information, which includes motion vector and corresponding reference picture index for each available reference picture list, is predicted and used without any modification/correction. Similarly, predicting the motion field information is carried out using the motion field information of adjacent blocks and/or co-located blocks in temporal reference pictures and the used motion field information is signalled among a list of motion field candidate list filled with motion field information of available adjacent/co-located blocks.

Typical video codecs enable the use of uni-prediction, where a single prediction block is used for a block being (de)coded, and bi-prediction, where two prediction blocks are combined to form the prediction for a block being (de)coded. Some video codecs enable weighted prediction, where the sample values of the prediction blocks are weighted prior to adding residual information. For example, multiplicative weighting factor and an additive offset which can be applied. In explicit weighted prediction, enabled by some video codecs, a weighting factor and offset may be coded for example in the slice header for each allowable reference picture index. In implicit weighted prediction, enabled by some video codecs, the weighting factors and/or offsets are not coded but are derived e.g. based on the relative picture order count (POC) distances of the reference pictures.

A direct reference picture for a first picture may be defined as a reference picture that is or may be used as a reference for prediction within the first picture. An indirect reference picture for a first may be defined as a reference picture that is not used as a reference for prediction within the first picture but is a direct reference picture for a direct or indirect reference picture of the first picture.

In typical video codecs the prediction residual after motion compensation is first transformed with a transform kernel (like DCT) and then coded. The reason for this is that often there still exists some correlation among the residual and transform can in many cases help reduce this correlation and provide more efficient coding.

Typical video encoders utilize Lagrangian cost functions to find optimal coding modes, e.g. the desired Macroblock mode and associated motion vectors. This kind of cost function uses a weighting factor $\lambda$ to tie together the (exact or estimated) image distortion due to lossy coding methods and the (exact or estimated) amount of information that is required to represent the pixel values in an image area:

$$C=D+\lambda R, \quad (1)$$

where C is the Lagrangian cost to be minimized, D is the image distortion (e.g. Mean Squared Error) with the mode and motion vectors considered, and R the number of bits needed to represent the required data to reconstruct the image block in the decoder (including the amount of data to represent the candidate motion vectors).

Video coding standards and specifications may allow encoders to divide a coded picture to coded slices or alike. In-picture prediction is typically disabled across slice boundaries. Thus, slices can be regarded as a way to split a coded picture to independently decodable pieces. In H.264/AVC and HEVC, in-picture prediction may be disabled across slice boundaries. Thus, slices can be regarded as a way to split a coded picture into independently decodable pieces, and slices are therefore often regarded as elementary units for transmission. In many cases, encoders may indicate in the bitstream which types of in-picture prediction are turned off across slice boundaries, and the decoder operation takes this information into account for example when concluding which prediction sources are available. For example, samples from a neighboring macroblock or CU may be regarded as unavailable for intra prediction, if the neighboring macroblock or CU resides in a different slice.

The elementary unit for the output of an H.264/AVC or HEVC encoder and the input of an H.264/AVC or HEVC decoder, respectively, is a Network Abstraction Layer (NAL) unit. For transport over packet-oriented networks or storage into structured files, NAL units may be encapsulated into packets or similar structures. A bytestream format has been specified in H.264/AVC and HEVC for transmission or storage environments that do not provide framing structures. The bytestream format separates NAL units from each other by attaching a start code in front of each NAL unit. To avoid false detection of NAL unit boundaries, encoders run a byte-oriented start code emulation prevention algorithm, which adds an emulation prevention byte to the NAL unit payload if a start code would have occurred otherwise. In order to enable straightforward gateway operation between packet- and stream-oriented systems, start code emulation prevention may always be performed regardless of whether the bytestream format is in use or not. A NAL unit may be defined as a syntax structure containing an indication of the type of data to follow and bytes containing that data in the form of an RBSP interspersed as necessary with emulation prevention bytes. A raw byte sequence payload (RBSP) may be defined as a syntax structure containing an integer number of bytes that is encapsulated in a NAL unit. An RBSP is either empty or has the form of a string of data bits containing syntax elements followed by an RBSP stop bit and followed by zero or more subsequent bits equal to 0.

NAL units consist of a header and payload. In H.264/AVC and HEVC, the NAL unit header indicates the type of the NAL unit. In H.264/AVC, the NAL unit header indicates whether a coded slice contained in the NAL unit is a part of a reference picture or a non-reference picture.

H.264/AVC NAL unit header includes a 2-bit nal_ref_idc syntax element, which when equal to 0 indicates that a coded slice contained in the NAL unit is a part of a non-reference picture and when greater than 0 indicates that a coded slice contained in the NAL unit is a part of a reference picture. The header for SVC and MVC NAL units may additionally contain various indications related to the scalability and multiview hierarchy.

In the HEVC standard, a two-byte NAL unit header is used for all specified NAL unit types. The NAL unit header contains one reserved bit, a six-bit NAL unit type indication, a three-bit nuh_temporal_id_plus1 indication for temporal level (may be required to be greater than or equal to 1) and a six-bit reserved field also be referred to as nuh_layer_id. The temporal_id syntax element may be regarded as a temporal identifier for the NAL unit, and a zero-based TemporalId variable may be derived as follows: TemporalId=temporal_id_plus1−1. TemporalId equal to 0 corresponds to the lowest temporal level. The value of temporal_id_plus1 is required to be non-zero in order to avoid start code emulation involving the two NAL unit header bytes. The six-bit reserved field (nuh_layer_id) is used by multi-layer extensions to carry information on the scalability hierarchy.

NAL units can be categorized into Video Coding Layer (VCL) NAL units and non-VCL NAL units. In H.264/AVC, VCL NAL units are typically coded slice NAL units and coded slice NAL units contain syntax elements representing one or more coded macroblocks, each of which corresponds to a block of samples in the uncompressed picture. In HEVC, VCL NAL units contain syntax elements representing one or more CU.

In H.264/AVC, a coded slice NAL unit can be indicated to be a coded slice in an Instantaneous Decoding Refresh (IDR) picture or coded slice in a non-IDR picture.

In HEVC, a VCL NAL unit can be indicated to be one of the following types:

| nal_unit_type | Name of nal_unit_type | Content of NAL unit and RBSP syntax structure |
|---|---|---|
| 0, 1 | TRAIL_N, TRAIL_R | Coded slice segment of a non-TSA, non-STSA trailing picture slice_segment_layer_rbsp( ) |
| 2, 3 | TSA_N, TSA_R | Coded slice segment of a TSA picture slice_segment_layer_rbsp( ) |
| 4, 5 | STSA_N, STSA_R | Coded slice segment of an STSA picture slice_layer_rbsp( ) |
| 6, 7 | RADL_N, RADL_R | Coded slice segment of a RADL picture slice_layer_rbsp( ) |
| 8, 9 | RASL_N, RASL_R, | Coded slice segment of a RASL picture slice_layer_rbsp( ) |
| 10, 12, 14 | RSV_VCL_N10 RSV_VCL_N12 RSV_VCL_N14 | Reserved // reserved non-RAP non-reference VCL NAL unit types |
| 11, 13, 15 | RSV_VCL_R11 RSV_VCL_R13 RSV_VCL_R15 | Reserved // reserved non-RAP reference VCL NAL unit types |
| 16, 17, 18 | BLA_W_LP BLA_W_DLP (a.k.a. IDR_W_RADL) BLA_N_LP | Coded slice segment of a BLA picture slice_segment_layer_rbsp( ) |
| 19, 20 | IDR_W_DLP (a.k.a. IDR_W_RADL) IDR_N_LP | Coded slice segment of an IDR picture slice_segment_layer_rbsp( ) |
| 21 | CRA_NUT | Coded slice segment of a CRA picture slice_segment_layer_rbsp( ) |
| 22, 23 | RSV_IRAP_VCL22 . . . RSV_IRAP_VCL23 | Reserved // reserved RAP VCL NAL unit types |
| 24 . . . 31 | RSV_VCL24 . . . RSV_VCL31 | Reserved // reserved non-RAP VCL NAL unit types |

In the HEVC standard, abbreviations for picture types may be defined as follows: trailing (TRAIL) picture, Temporal Sub-layer Access (TSA), Step-wise Temporal Sub-layer Access (STSA), Random Access Decodable Leading (RADL) picture, Random Access Skipped Leading (RASL) picture, Broken Link Access (BLA) picture, Instantaneous Decoding Refresh (IDR) picture, Clean Random Access (CRA) picture.

A Random Access Point (RAP) picture, which may also be referred to as an intra random access point (IRAP) picture, is a picture where each slice or slice segment has nal_unit_type in the range of 16 to 23, inclusive. A RAP picture contains only intra-coded slices, and may be a BLA picture, a CRA picture or an IDR picture. The first picture in the bitstream is a RAP picture. Provided the necessary parameter sets are available when they need to be activated, the RAP picture and all subsequent non-RASL pictures in decoding order can be correctly decoded without performing the decoding process of any pictures that precede the RAP picture in decoding order. There may be pictures in a bitstream that contain only intra-coded slices that are not RAP pictures.

In HEVC, a CRA picture may be the first picture in the bitstream in decoding order, or may appear later in the bitstream. CRA pictures in HEVC allow so-called leading pictures that follow the CRA picture in decoding order but precede it in output order. Some of the leading pictures, so-called RASL pictures, may use pictures decoded before the CRA picture as a reference. Pictures that follow a CRA picture in both decoding and output order are decodable if random access is performed at the CRA picture, and hence clean random access is achieved similarly to the clean random access functionality of an IDR picture.

A CRA picture may have associated RADL or RASL pictures. When a CRA picture is the first picture in the bitstream in decoding order, the CRA picture is the first picture of a coded video sequence in decoding order, and any associated RASL pictures are not output by the decoder and may not be decodable, as they may contain references to pictures that are not present in the bitstream.

A leading picture is a picture that precedes the associated RAP picture in output order. The associated RAP picture is the previous RAP picture in decoding order (if present). A leading picture is either a RADL picture or a RASL picture.

All RASL pictures are leading pictures of an associated BLA or CRA picture. When the associated RAP picture is a BLA picture or is the first coded picture in the bitstream, the RASL picture is not output and may not be correctly decodable, as the RASL picture may contain references to pictures that are not present in the bitstream. However, a RASL picture can be correctly decoded if the decoding had started from a RAP picture before the associated RAP picture of the RASL picture. RASL pictures are not used as reference pictures for the decoding process of non-RASL pictures. When present, all RASL pictures precede, in decoding order, all trailing pictures of the same associated RAP picture. In some earlier drafts of the HEVC standard, a RASL picture was referred to a Tagged for Discard (TFD) picture.

All RADL pictures are leading pictures. RADL pictures are not used as reference pictures for the decoding process of trailing pictures of the same associated RAP picture. When present, all RADL pictures precede, in decoding order, all trailing pictures of the same associated RAP picture. RADL pictures do not refer to any picture preceding the associated RAP picture in decoding order and can therefore be correctly decoded when the decoding starts from the associated RAP picture. In some earlier drafts of the HEVC standard, a RADL picture was referred to a Decodable Leading Picture (DLP).

When a part of a bitstream starting from a CRA picture is included in another bitstream, the RASL pictures associated with the CRA picture might not be correctly decodable, because some of their reference pictures might not be present in the combined bitstream. To make such a splicing operation straightforward, the NAL unit type of the CRA picture can be changed to indicate that it is a BLA picture. The RASL pictures associated with a BLA picture may not be correctly decodable hence are not be output/displayed. Furthermore, the RASL pictures associated with a BLA picture may be omitted from decoding.

A BLA picture may be the first picture in the bitstream in decoding order, or may appear later in the bitstream. Each BLA picture begins a new coded video sequence, and has similar effect on the decoding process as an IDR picture. However, a BLA picture contains syntax elements that specify a non-empty reference picture set. When a BLA picture has nal_unit_type equal to BLA_W_LP, it may have associated RASL pictures, which are not output by the decoder and may not be decodable, as they may contain references to pictures that are not present in the bitstream. When a BLA picture has nal_unit_type equal to BLA_W_LP, it may also have associated RADL pictures, which are specified to be decoded. When a BLA picture has nal_unit_type equal to BLA_W_DLP, it does not have associated RASL pictures but may have associated RADL pictures, which are specified to be decoded. When a BLA picture has nal_unit_type equal to BLA_N_LP, it does not have any associated leading pictures.

An IDR picture having nal_unit_type equal to IDR_N_LP does not have associated leading pictures present in the bitstream. An IDR picture having nal_unit_type equal to IDR_W_LP does not have associated RASL pictures present in the bitstream, but may have associated RADL pictures in the bitstream.

When the value of nal_unit_type is equal to TRAIL_N, TSA_N, STSA_N, RADL_N, RASL_N, RSV_VCL_N10, RSV_VCL_N12, or RSV_VCL_N14, the decoded picture is not used as a reference for any other picture of the same temporal sub-layer. That is, in the HEVC standard, when the value of nal_unit_type is equal to TRAIL_N, TSA_N, STSA_N, RADL_N, RASL_N, RSV_VCL_N10, RSV_VCL_N12, or RSV_VCL_N14, the decoded picture is not included in any of RefPicSetStCurrBefore, RefPicSetStCurrAfter and RefPicSetLtCurr of any picture with the same value of TemporalId. A coded picture with nal_unit_type equal to TRAIL_N, TSA_N, STSA_N, RADL_N, RASL_N, RSV_VCL_N10, RSV_VCL_N12, or RSV_VCL_N14 may be discarded without affecting the decodability of other pictures with the same value of TemporalId.

A trailing picture may be defined as a picture that follows the associated RAP picture in output order. Any picture that is a trailing picture does not have nal_unit_type equal to RADL_N, RADL_R, RASL_N or RASL_R. Any picture that is a leading picture may be constrained to precede, in decoding order, all trailing pictures that are associated with the same RAP picture. No RASL pictures are present in the bitstream that are associated with a BLA picture having nal_unit_type equal to BLA_W_DLP or BLA_N_LP. No RADL pictures are present in the bitstream that are associated with a BLA picture having nal_unit_type equal to BLA_N_LP or that are associated with an IDR picture having nal_unit_type equal to IDR_N_LP. Any RASL picture associated with a CRA or BLA picture may be constrained to precede any RADL picture associated with the CRA or BLA picture in output order. Any RASL picture associated with a CRA picture may be constrained to follow, in output order, any other RAP picture that precedes the CRA picture in decoding order.

In HEVC there are two picture types, the TSA and STSA picture types that can be used to indicate temporal sub-layer switching points. If temporal sub-layers with TemporalId up to N had been decoded until the TSA or STSA picture (exclusive) and the TSA or STSA picture has TemporalId equal to N+1, the TSA or STSA picture enables decoding of all subsequent pictures (in decoding order) having TemporalId equal to N+1. The TSA picture type may impose restrictions on the TSA picture itself and all pictures in the same sub-layer that follow the TSA picture in decoding order. None of these pictures is allowed to use inter prediction from any picture in the same sub-layer that precedes the TSA picture in decoding order. The TSA definition may further impose restrictions on the pictures in higher sub-layers that follow the TSA picture in decoding order. None of these pictures is allowed to refer a picture that precedes the TSA picture in decoding order if that picture belongs to the same or higher sub-layer as the TSA picture. TSA pictures have TemporalId greater than 0. The STSA is similar to the TSA picture but does not impose restrictions on the pictures in higher sub-layers that follow the STSA picture in decoding order and hence enable up-switching only onto the sub-layer where the STSA picture resides.

A non-VCL NAL unit may be for example one of the following types: a sequence parameter set, a picture parameter set, a supplemental enhancement information (SEI) NAL unit, an access unit delimiter, an end of sequence NAL unit, an end of stream NAL unit, or a filler data NAL unit.

Parameter sets may be needed for the reconstruction of decoded pictures, whereas many of the other non-VCL NAL units are not necessary for the reconstruction of decoded sample values.

Parameters that remain unchanged through a coded video sequence may be included in a sequence parameter set. In addition to the parameters that may be needed by the decoding process, the sequence parameter set may optionally contain video usability information (VUI), which includes parameters that may be important for buffering, picture output timing, rendering, and resource reservation. There are three NAL units specified in H.264/AVC to carry sequence parameter sets: the sequence parameter set NAL unit containing all the data for H.264/AVC VCL NAL units in the sequence, the sequence parameter set extension NAL unit containing the data for auxiliary coded pictures, and the subset sequence parameter set for MVC and SVC VCL NAL units. In the HEVC standard a sequence parameter set RBSP includes parameters that can be referred to by one or more picture parameter set RBSPs or one or more SEI NAL units containing a buffering period SEI message. A picture parameter set contains such parameters that are likely to be unchanged in several coded pictures. A picture parameter set RBSP may include parameters that can be referred to by the coded slice NAL units of one or more coded pictures.

In HEVC, a video parameter set (VPS) may be defined as a syntax structure containing syntax elements that apply to zero or more entire coded video sequences as determined by the content of a syntax element found in the SPS referred to by a syntax element found in the PPS referred to by a syntax element found in each slice segment header.

A video parameter set RBSP may include parameters that can be referred to by one or more sequence parameter set RBSPs.

The relationship and hierarchy between video parameter set (VPS), sequence parameter set (SPS), and picture parameter set (PPS) may be described as follows. VPS resides one level above SPS in the parameter set hierarchy and in the context of scalability and/or 3D video. VPS may include parameters that are common for all slices across all (scalability or view) layers in the entire coded video sequence.

SPS includes the parameters that are common for all slices in a particular (scalability or view) layer in the entire coded video sequence, and may be shared by multiple (scalability or view) layers. PPS includes the parameters that are common for all slices in a particular layer representation (the representation of one scalability or view layer in one access unit) and are likely to be shared by all slices in multiple layer representations.

VPS may provide information about the dependency relationships of the layers in a bitstream, as well as many other information that are applicable to all slices across all (scalability or view) layers in the entire coded video sequence. In multi-layer extensions of HEVC, VPS may for example include a mapping of the nuh_layer_id value derived from the NAL unit header to one or more scalability dimension values, for example correspond to dependency_id, quality_id, view_id, and depth_flag for the layer defined similarly to SVC and MVC. VPS may include profile and level information for one or more layers as well as the profile and/or level for one or more temporal sub-layers (consisting of VCL NAL units at and below certain temporal_id values) of a layer representation.

H.264/AVC and HEVC syntax allows many instances of parameter sets, and each instance is identified with a unique identifier. In order to limit the memory usage needed for parameter sets, the value range for parameter set identifiers has been limited. In H.264/AVC and HEVC standard, each slice header includes the identifier of the picture parameter set that is active for the decoding of the picture that contains the slice, and each picture parameter set contains the identifier of the active sequence parameter set. Consequently, the transmission of picture and sequence parameter sets does not have to be accurately synchronized with the transmission of slices. Instead, it is sufficient that the active sequence and picture parameter sets are received at any moment before they are referenced, which allows transmission of parameter sets "out-of-band" using a more reliable transmission mechanism compared to the protocols used for the slice data. For example, parameter sets can be included as a parameter in the session description for Real-time Transport Protocol (RTP) sessions. If parameter sets are transmitted in-band, they can be repeated to improve error robustness.

A parameter set may be activated by a reference from a slice or from another active parameter set or in some cases from another syntax structure such as a buffering period SEI message.

A SEI NAL unit may contain one or more SEI messages, which are not required for the decoding of output pictures but may assist in related processes, such as picture output timing, rendering, error detection, error concealment, and resource reservation. Several SEI messages are specified in H.264/AVC and HEVC, and the user data SEI messages enable organizations and companies to specify SEI messages for their own use. H.264/AVC and HEVC contain the syntax and semantics for the specified SEI messages but no process for handling the messages in the recipient is defined. Consequently, encoders are required to follow the H.264/AVC standard or the HEVC standard when they create SEI messages, and decoders conforming to the H.264/AVC standard or the HEVC standard, respectively, are not required to process SEI messages for output order conformance. One of the reasons to include the syntax and semantics of SEI messages in H.264/AVC and HEVC is to allow different system specifications to interpret the supplemental information identically and hence interoperate. It is intended that system specifications can require the use of particular SEI messages both in the encoding end and in the decoding end, and additionally the process for handling particular SEI messages in the recipient can be specified.

A coded picture is a coded representation of a picture. A coded picture in H.264/AVC comprises the VCL NAL units that are required for the decoding of the picture. In H.264/AVC, a coded picture can be a primary coded picture or a redundant coded picture. A primary coded picture is used in the decoding process of valid bitstreams, whereas a redundant coded picture is a redundant representation that should only be decoded when the primary coded picture cannot be successfully decoded. In HEVC, no redundant coded picture has been specified.

In H.264/AVC, an access unit comprises a primary coded picture and those NAL units that are associated with it. In H.264/AVC, the appearance order of NAL units within an access unit is constrained as follows. An optional access unit delimiter NAL unit may indicate the start of an access unit. It is followed by zero or more SEI NAL units. The coded slices of the primary coded picture appear next. In H.264/AVC, the coded slice of the primary coded picture may be followed by coded slices for zero or more redundant coded pictures. A redundant coded picture is a coded representation of a picture or a part of a picture. A redundant coded picture may be decoded if the primary coded picture is not received by the decoder for example due to a loss in transmission or a corruption in physical storage medium.

In H.264/AVC, an access unit may also include an auxiliary coded picture, which is a picture that supplements the primary coded picture and may be used for example in the display process. An auxiliary coded picture may for example be used as an alpha channel or alpha plane specifying the transparency level of the samples in the decoded pictures. An alpha channel or plane may be used in a layered composition or rendering system, where the output picture is formed by overlaying pictures being at least partly transparent on top of each other. An auxiliary coded picture has the same syntactic and semantic restrictions as a monochrome redundant coded picture. In H.264/AVC, an auxiliary coded picture contains the same number of macroblocks as the primary coded picture.

In HEVC, an access unit may be defined as a set of NAL units that are associated with each other according to a specified classification rule, are consecutive in decoding order, and contain exactly one coded picture. In addition to containing the VCL NAL units of the coded picture, an access unit may also contain non-VCL NAL units. The decoding of an access unit always results in a decoded picture.

In H.264/AVC, a coded video sequence is defined to be a sequence of consecutive access units in decoding order from an IDR access unit, inclusive, to the next IDR access unit, exclusive, or to the end of the bitstream, whichever appears earlier. In the HEVC standard, a coded video sequence may be defined to be a sequence of access units that consists, in decoding order, of a CRA access unit that is the first access unit in the bitstream, an IDR access unit or a BLA access unit, followed by zero or more non-IDR and non-BLA access units including all subsequent access units up to but not including any subsequent IDR or BLA access unit.

A bitstream may be defined as a sequence of bits, in the form of a NAL unit stream or a byte stream, that forms the representation of coded pictures and associated data forming one or more coded video sequences. A first bitstream may be followed by a second bitstream in the same logical channel, such as in the same file or in the same connection of a communication protocol, also sometimes referred to as the same elementary stream. The end of the first bitstream may be indicated by a specific NAL unit, which may be referred to as the end of bitstream (EOB) NAL unit and which is the last NAL unit of the bitstream. In HEVC and its current draft extensions, the EOB NAL unit is required to have nuh_layer_id equal to 0.

A group of pictures (GOP) and its characteristics may be defined as follows. A GOP can be decoded regardless of whether any previous pictures were decoded. An open GOP is such a group of pictures in which pictures preceding the initial intra picture in output order might not be correctly decodable when the decoding starts from the initial intra picture of the open GOP. In other words, pictures of an open GOP may refer (in inter prediction) to pictures belonging to a previous GOP. An H.264/AVC decoder can recognize an intra picture starting an open GOP from the recovery point SEI message in an H.264/AVC bitstream. An HEVC decoder can recognize an intra picture starting an open GOP, because a specific NAL unit type, CRA NAL unit type, can be used for its coded slices. A closed GOP is such a group of pictures in which all pictures can be correctly decoded when the decoding starts from the initial intra picture of the closed GOP. In other words, no picture in a closed GOP refers to any pictures in previous GOPs. In H.264/AVC and HEVC, a closed GOP may be considered to start from an IDR access unit. As a result, closed GOP structure has more error resilience potential in comparison to the open GOP structure, however at the cost of possible reduction in the compression efficiency. Open GOP coding structure is potentially more efficient in the compression, due to a larger flexibility in selection of reference pictures.

H.264/AVC and HEVC include a concept of picture order count (POC). A value of POC is derived for each picture and is non-decreasing with increasing picture position in output order. POC therefore indicates the output order of pictures. POC may be used in the decoding process for example for implicit scaling of motion vectors in the temporal direct mode of bi-predictive slices, for implicitly derived weights in weighted prediction, and for reference picture list initialization. Furthermore, POC may be used in the verification of output order conformance. In H.264/AVC, POC is specified relative to the previous IDR picture or a picture containing a memory management control operation marking all pictures as "unused for reference".

In H.265/HEVC, when multi-layer extensions are not in use, picture order count (de)coding and derivation, is carried out as follows:

POC is specified relative to the previous IRAP picture with NoRaslOutputFlag equal to 1. The value of NoRaslOutputFlag is equal to 1 for each IDR picture, each BLA picture, and each CRA picture that is the first picture in the bitstream in decoding order, is the first picture that follows an end of sequence NAL unit in decoding order, or has HandleCraAsBlaFlag equal to 1.

4 to 16 bits of the least significant bits (LSBs) of the POC values are encoded into a bitstream and/or decoded from a bitstream for each picture (other than IDR pictures for which the LSB). To be more specific the LSBs are represented by u(v)-coded slice_pic_order_cnt_lsb syntax element, which is present in the slice_segment_ headers (for other picture types than IDR pictures). The number of bits of the slice_pic_order_cnt_lsb syntax element is specified by the ue(v)-coded log2_max_pic_order_cnt_lsb_minus4 syntax element in the sequence parameter set syntax structure. In log2_max_pic_order_cnt_lsb_minus4 also specifies the value of the variable MaxPicOrderCntLsb that is used in the decoding process for picture order count as follows: MaxPicOrderCntLsb=$2^{(log2\_max\_pic\_order\_cnt\_lsb\_minus4+4)}$ The value of log2_max_pic_order_cnt_lsb_minus4 is in the range of 0 to 12, inclusive.

The signaled POC LSB is used to determine whether the POC value of the current picture is smaller or larger than the POC value of the previous picture in decoding order that has TemporalId equal to 0 and that is not a RASL picture, a RADL picture, or a sub-layer non-reference picture. This previous picture is referred to as prevTid0Pic in the H.265/HEVC decoding process.

The decoding process of deriving PicOrderCntVal, the picture order count of the current picture, is carried out as follows:

When the current picture is not an IRAP picture with NoRaslOutputFlag equal to 1, the variables prevPicOrderCntLsb and prevPicOrderCntMsb are derived as follows:

Let prevTid0Pic be the previous picture in decoding order that has TemporalId equal to 0 and that is not a RASL picture, a RADL picture, or a sub-layer non-reference picture.

The variable prevPicOrderCntLsb is set equal to slice_pic_order_cnt_lsb of prevTid0Pic.

The variable prevPicOrderCntMsb is set equal to PicOrderCntMsb of prevTid0Pic.

The variable PicOrderCntMsb of the current picture is derived as follows:

If the current picture is an IRAP picture with NoRaslOutputFlag equal to 1, PicOrderCntMsb is set equal to 0.

Otherwise, PicOrderCntMsb is derived as follows:

```
if( ( slice_pic_order_cnt_lsb < prevPicOrderCntLsb ) &&
( ( prevPicOrderCntLsb − slice_pic_order_cnt_lsb ) >=
( MaxPicOrderCntLsb / 2 ) ) )
PicOrderCntMsb = prevPicOrderCntMsb + MaxPicOrderCntLsb
else if( (slice_pic_order_cnt_lsb > prevPicOrderCntLsb ) &&
( ( slice_pic_order_cnt_lsb − prevPicOrderCntLsb ) >
( MaxPicOrderCntLsb / 2 ) ) )
PicOrderCntMsb = prevPicOrderCntMsb − MaxPicOrderCntLsb
else
PicOrderCntMsb = prevPicOrderCntMsb
```

PicOrderCntVal is derived as follows:
PicOrderCntVal=PicOrderCntMsb+slice_pic_order_cnt_lsb The process above has an impact that all IDR pictures will have PicOrderCntVal equal to 0 since slice_pic_order_cnt_lsb is inferred to be 0 for IDR pictures and prevPicOrderCntLsb and prevPicOrderCntMsb are both set equal to 0.

The function PicOrderCnt(picX) is specified as follows:
PicOrderCnt(picX)=PicOrderCntVal of the picture picX The function DiffPicOrderCnt(picA, picB) is specified as follows:
DiffPicOrderCnt(picA, picB)=PicOrderCnt(picA)−PicOrderCnt(picB)

In H.265/HEVC, when no multi-layer extensions are in use, it is required that the value of PicOrderCntVal is in the range of $-2^{31}$ to $2^{31}-1$, inclusive. In one coded video sequence, the PicOrderCntVal values for any two coded pictures differ. Furthermore, in H.265/HEVC it is required that the bitstream does not contain data that result in values of DiffPicOrderCnt(picA, picB) used in the decoding process that are not in the range of $-2^{15}$ to $2^{15}-1$, inclusive.

The bitstream syntax of H.264/AVC and HEVC indicates whether a particular picture is a reference picture for inter prediction of any other picture. Pictures of any coding type (I, P, B) can be reference pictures or non-reference pictures in H.264/AVC and HEVC.

H.264/AVC specifies the process for decoded reference picture marking in order to control the memory consumption in the decoder. The maximum number of reference pictures used for inter prediction, referred to as M, is determined in the sequence parameter set. When a reference picture is decoded, it is marked as "used for reference". If the decoding of the reference picture caused more than M pictures marked as "used for reference", at least one picture is marked as "unused for reference". There are two types of operation for decoded reference picture marking: adaptive memory control and sliding window. The operation mode for decoded reference picture marking is selected on picture basis. The adaptive memory control enables explicit signaling which pictures are marked as "unused for reference" and may also assign long-term indices to short-term reference pictures. The adaptive memory control may require the presence of memory management control operation (MMCO) parameters in the bitstream. MMCO parameters may be included in a decoded reference picture marking syntax structure. If the sliding window operation mode is in use and there are M pictures marked as "used for reference", the short-term reference picture that was the first decoded picture among those short-term reference pictures that are marked as "used for reference" is marked as "unused for reference". In other words, the sliding window operation mode results into first-in-first-out buffering operation among short-term reference pictures.

One of the memory management control operations in H.264/AVC causes all reference pictures except for the current picture to be marked as "unused for reference". An instantaneous decoding refresh (IDR) picture contains only intra-coded slices and causes a similar "reset" of reference pictures.

In the HEVC standard, reference picture marking syntax structures and related decoding processes are not used, but instead a reference picture set (RPS) syntax structure and decoding process are used instead for a similar purpose. A reference picture set valid or active for a picture includes all the reference pictures used as reference for the picture and all the reference pictures that are kept marked as "used for reference" for any subsequent pictures in decoding order. There are six subsets of the reference picture set, which are referred to as namely RefPicSetStCurr0, RefPicSetStCurr1, RefPicSetStFoll0, RefPicSetStFoll1, RefPicSetLtCurr, and RefPicSetLtFoll. The notation of the six subsets is as follows. "Curr" refers to reference pictures that are included in the reference picture lists of the current picture and hence may be used as inter prediction reference for the current picture. "Foll" refers to reference pictures that are not included in the reference picture lists of the current picture but may be used in subsequent pictures in decoding order as reference pictures. "St" refers to short-term reference pictures, which may generally be identified through a certain number of least significant bits of their POC value. "Lt" refers to long-term reference pictures, which are specifically identified and generally have a greater difference of POC values relative to the current picture than what can be represented by the mentioned certain number of least significant bits. "0" refers to those reference pictures that have a smaller POC value than that of the current picture. "1" refers to those reference pictures that have a greater POC value than that of the current picture. RefPicSetStCurr0, RefPicSetStCurr1, RefPicSetStFoll0 and RefPicSetStFoll1 are collectively referred to as the short-term subset of the reference picture set. RefPicSetLtCurr and RefPicSetLtFoll are collectively referred to as the long-term subset of the reference picture set.

In the HEVC standard, a reference picture set may be specified in a sequence parameter set and taken into use in the slice header through an index to the reference picture set. A reference picture set may also be specified in a slice header. A long-term subset of a reference picture set is generally specified only in a slice header, while the short-term subsets of the same reference picture set may be specified in the picture parameter set or slice header. A reference picture set may be coded independently or may be predicted from another reference picture set (known as inter-RPS prediction). When a reference picture set is independently coded, the syntax structure includes up to three loops iterating over different types of reference pictures; short-term reference pictures with lower POC value than the current picture, short-term reference pictures with higher POC value than the current picture and long-term reference pictures. Each loop entry specifies a picture to be marked as "used for reference". In general, the picture is specified with a differential POC value. The inter-RPS prediction exploits the fact that the reference picture set of the current picture can be predicted from the reference picture set of a previously decoded picture. This is because all the reference pictures of the current picture are either reference pictures of the previous picture or the previously decoded picture itself. It is only necessary to indicate which of these pictures should be reference pictures and be used for the prediction of the current picture. In both types of reference picture set coding, a flag (used_by_curr_pic_X_flag) is additionally sent for each reference picture indicating whether the reference picture is used for reference by the current picture (included in a *Curr list) or not (included in a *Foll list). Pictures that are included in the reference picture set used by the current slice are marked as "used for reference", and pictures that are not in the reference picture set used by the current slice are marked as "unused for reference". If the current picture is an IDR picture, RefPicSetStCurr0, RefPicSetStCurr1, RefPicSetStFoll0, RefPicSetStFoll1, RefPicSetLtCurr, and RefPicSetLtFoll are all set to empty.

A Decoded Picture Buffer (DPB) may be used in the encoder and/or in the decoder. There are two reasons to buffer decoded pictures, for references in inter prediction and for reordering decoded pictures into output order. As H.264/AVC and HEVC provide a great deal of flexibility for both reference picture marking and output reordering, separate buffers for reference picture buffering and output picture buffering may waste memory resources. Hence, the DPB may include a unified decoded picture buffering process for reference pictures and output reordering. A decoded picture may be removed from the DPB when it is no longer used as a reference and is not needed for output.

In many coding modes of H.264/AVC and HEVC, the reference picture for inter prediction is indicated with an index to a reference picture list. The index may be coded with variable length coding, which usually causes a smaller index to have a shorter value for the corresponding syntax element. In H.264/AVC and HEVC, two reference picture lists (reference picture list 0 and reference picture list 1) are generated for each bi-predictive (B) slice, and one reference picture list (reference picture list 0) is formed for each inter-coded (P) slice.

A reference picture list, such as reference picture list 0 and reference picture list 1, is typically constructed in two steps: First, an initial reference picture list is generated. The initial reference picture list may be generated for example on the basis of frame_num, POC, temporal_id, or information on the prediction hierarchy such as GOP structure, or any combination thereof. Second, the initial reference picture list may be reordered by reference picture list reordering (RPLR) commands, also known as reference picture list modification syntax structure, which may be contained in slice headers. In H.264/AVC, the RPLR commands indicate the pictures that are ordered to the beginning of the respective reference picture list. This second step may also be referred to as the reference picture list modification process, and the RPLR commands may be included in a reference picture list modification syntax structure. If reference picture sets are used, the reference picture list 0 may be initialized to contain RefPicSetStCurr0 first, followed by RefPicSetStCurr1, followed by RefPicSetLtCurr. Reference picture list 1 may be initialized to contain RefPicSetStCurr1 first, followed by RefPicSetStCurr0. In HEVC, the initial reference picture lists may be modified through the reference picture list modification syntax structure, where pictures in the initial reference picture lists may be identified through an entry index to the list. In other words, in HEVC, reference picture list modification is encoded into a syntax structure comprising a loop over each entry in the final reference picture list, where each loop entry is a fixed-length coded index to the initial reference picture list and indicates the picture in ascending position order in the final reference picture list.

Many coding standards, including H.264/AVC and HEVC, may have decoding process to derive a reference picture index to a reference picture list, which may be used to indicate which one of the multiple reference pictures is used for inter prediction for a particular block. A reference picture index may be coded by an encoder into the bitstream is some inter coding modes or it may be derived (by an encoder and a decoder) for example using neighboring blocks in some other inter coding modes.

In order to represent motion vectors efficiently in bitstreams, motion vectors may be coded differentially with respect to a block-specific predicted motion vector. In many video codecs, the predicted motion vectors are created in a predefined way, for example by calculating the median of the encoded or decoded motion vectors of the adjacent blocks. Another way to create motion vector predictions, sometimes referred to as advanced motion vector prediction (AMVP), is to generate a list of candidate predictions from adjacent blocks and/or co-located blocks in temporal reference pictures and signalling the chosen candidate as the motion vector predictor. In addition to predicting the motion vector values, the reference index of previously coded/decoded picture can be predicted. The reference index is typically predicted from adjacent blocks and/or co-located blocks in temporal reference picture. Differential coding of motion vectors is typically disabled across slice boundaries.

Many high efficiency video codecs such as an HEVC codec employ an additional motion information coding/decoding mechanism, often called merging/merge mode/process/mechanism, where all the motion information of a block/PU is predicted and used without any modification/correction.

Scalable video coding refers to coding structure where one bitstream can contain multiple representations of the content at different bitrates, resolutions or frame rates. In these cases the receiver can extract the desired representation depending on its characteristics (e.g. resolution that matches best the display device). Alternatively, a server or a network element can extract the portions of the bitstream to be transmitted to the receiver depending on e.g. the network characteristics or processing capabilities of the receiver. A scalable bitstream typically consists of a "base layer" providing the lowest quality video available and one or more enhancement layers that enhance the video quality when received and decoded together with the lower layers. In order to improve coding efficiency for the enhancement layers, the coded representation of that layer typically depends on the lower layers. E.g. the motion and mode information of the enhancement layer can be predicted from lower layers. Similarly the pixel data of the lower layers can be used to create prediction for the enhancement layer.

In some scalable video coding schemes, a video signal can be encoded into a base layer and one or more enhancement layers. An enhancement layer may enhance the temporal resolution (i.e., the frame rate), the spatial resolution, or simply the quality of the video content represented by another layer or part thereof. Each layer together with all its dependent layers is one representation of the video signal at a certain spatial resolution, temporal resolution and quality level. In this document, we refer to a scalable layer together with all of its dependent layers as a "scalable layer representation". The portion of a scalable bitstream corresponding to a scalable layer representation can be extracted and decoded to produce a representation of the original signal at certain fidelity.

Some coding standards allow creation of scalable bit streams. A meaningful decoded representation can be produced by decoding only certain parts of a scalable bit stream. Scalable bit streams can be used for example for rate adaptation of pre-encoded unicast streams in a streaming server and for transmission of a single bit stream to terminals having different capabilities and/or with different network conditions. A list of some other use cases for scalable video coding can be found in the ISO/IEC JTC1 SC29 WG11 (MPEG) output document N5540, "Applications and Requirements for Scalable Video Coding", the 64$^{th}$ MPEG meeting, Mar. 10 to 14, 2003, Pattaya, Thailand.

Available media file format standards include ISO base media file format (ISO/IEC 14496-12, which may be abbreviated ISOBMFF), MPEG-4 file format (ISO/IEC 14496-14, also known as the MP4 format), AVC file format (ISO/IEC 14496-15) and 3GPP file format (3GPP TS 26.244, also known as the 3GP format). The SVC and MVC file formats are specified as amendments to the AVC file format. The ISO file format is the base for derivation of all the above mentioned file formats (excluding the ISO file format itself). These file formats (including the ISO file format itself) are generally called the ISO family of file formats.

The basic building block in the ISO base media file format is called a box. Each box has a header and a payload. The box header indicates the type of the box and the size of the box in terms of bytes. A box may enclose other boxes, and the ISO file format specifies which box types are allowed within a box of a certain type. Furthermore, the presence of some boxes may be mandatory in each file, while the presence of other boxes may be optional. Additionally, for some box types, it may be allowable to have more than one box present in a file. Thus, the ISO base media file format may be considered to specify a hierarchical structure of boxes.

Figure 5:
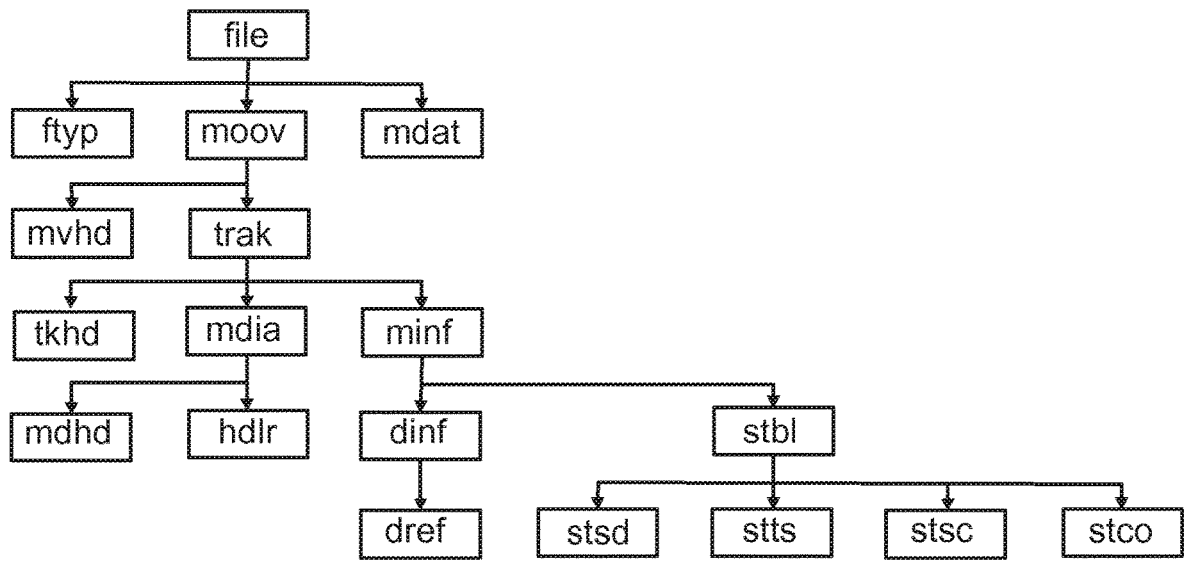
FIG. 5 shows an example of containment hierarchy of ISOBMFF box structures.

According to the ISO family of file formats, a file includes media data and metadata that are encapsulated into boxes. Each box is identified by a four character code (4CC) and starts with a header which informs about the type and size of the box. An example containment hierarchy of ISOBMFF box structures is shown in FIG. 5.

In an example embodiment, the media data may be provided in a media data 'mdat' box and the movie 'moov' box may be used to enclose the metadata. In some cases, for a file to be operable, both of the 'mdat' and 'moov' boxes may be required to be present. The movie 'moov' box may include one or more tracks, and each track may reside in one corresponding track 'trak' box. A track may be one of the following types: media, hint, timed metadata. A media track refers to samples formatted according to a media compression format (and its encapsulation to the ISO base media file format). A hint track refers to hint samples, containing cookbook instructions for constructing packets for transmission over an indicated communication protocol. The cookbook instructions may include guidance for packet header construction and include packet payload construction. In the packet payload construction, data residing in other tracks or items may be referenced. As such, for example, data residing in other tracks or items may be indicated by a reference as to which piece of data in a particular track or item is instructed to be copied into a packet during the packet construction process. A timed metadata track may refer to samples describing referred media and/or hint samples. For the presentation of one media type, typically one media track is selected. Samples of a track may be implicitly associated with sample numbers that are incremented by 1 in the indicated decoding order of samples. The first sample in a track may be associated with sample number 1.

An example of a simplified file structure according to the ISO base media file format may be described as follows. The file may include the 'moov' box and the 'mdat' box and the 'moov' box may include one or more tracks that correspond to video and audio, respectively.

Many files formatted according to the ISO base media file format start with a file type box, also referred to as the ftyp box. The ftyp box contains information of the brands labeling the file. The ftyp box includes one major brand indication and a list of compatible brands. The major brand identifies the most suitable file format specification to be used for parsing the file. The compatible brands indicate which file format specifications and/or conformance points the file conforms to. It is possible that a file is conformant to multiple specifications. All brands indicating compatibility to these specifications should be listed, so that a reader only understanding a subset of the compatible brands can get an indication that the file can be parsed. Compatible brands also give a permission for a file parser of a particular file format specification to process a file containing the same particular file format brand in the ftyp box. A file player may check if the ftyp box of a file comprises brands it supports, and may parse and play the file only if any file format specification supported by the file player is listed among the compatible brands.

Files conforming to ISOBMFF may contain any non-timed metadata objects in a meta box (fourCC: 'meta'). The meta box may reside at the top level of the file, within a movie box (fourCC: 'moov'), and within a track box (fourCC: 'trak'), but at most one meta box may occur at each of the file level, movie level, or track level. The meta box may be required to contain a 'hdlr' box indicating the structure or format of the 'meta' box contents. The meta box may list and characterize any number of metadata items that can be referred and each one of them can be associated with a file name and are uniquely identified with the file by item identifier (item_id) which is an integer value. The metadata items may be for example stored in the meta box or in an mdat box or reside in a separate file. If the metadata is located external to the file then its location may be declared by the DataInformationBox (fourCC: 'dinf'). In the specific case that the metadata is formatted using XML syntax and is required to be stored directly in the MetaBox, the metadata may be encapsulated into either the XMLBox (fourCC: 'xml') or the BinaryXMLBox (fourcc: 'bxml').

In order to support more than one meta box at any level of the hierarchy (file, movie, or track), a meta box container box ('meco') may be used as one ISO base media file format. The meta box container box may carry any number of additional meta boxes at any level of the hierarchy (file, movie, or track). This may allow that e.g. the same metadata is being presented in two different, alternative metadata systems. The meta box relation box ('mere') may enable describing how different meta boxes relate to each other, e.g. whether they contain exactly the same metadata (but described with different schemes) or if one represents a superset of another one.

The ISO base media file format does not limit a presentation to be contained in one file. As such, a presentation may be comprised within several files. As an example, one file may include the metadata for the whole presentation and may thereby include all the media data to make the presentation self-contained. Other files, if used, may not be required to be formatted to ISO base media file format, and may be used to include media data, and may also include unused media data, or other information. The ISO base media file format concerns the structure of the presentation file only. The format of the media-data files may be constrained by the ISO base media file format or its derivative formats only in that the media-data in the media files is formatted as specified in the ISO base media file format or its derivative formats.

The ability to refer to external files may be realized through data references. In some examples, a sample description 'stsd' box included in each track may provide a list of sample entries, each providing detailed information about the coding type used, and any initialization information needed for that coding. All samples of a chunk and all samples of a track fragment may use the same sample entry. A chunk may be defined as a contiguous set of samples for one track. The Data Reference 'dref' box, also included in each track, may define an indexed list of uniform resource locators (URLs), uniform resource names (URNs), and/or self-references to the file containing the metadata. A sample entry may point to one index of the Data Reference box, thereby indicating the file containing the samples of the respective chunk or track fragment.

Movie fragments may be used when recording content to ISO files in order to avoid losing data if a recording application crashes, runs out of memory space, or some other incident occurs. Without movie fragments, data loss may occur because the file format may typically require that all metadata, e.g., the movie box, be written in one contiguous area of the file. Furthermore, when recording a file, there may not be sufficient amount of memory space (e.g., RAM) to buffer a movie box for the size of the storage available, and re-computing the contents of a movie box when the movie is closed may be too slow. Moreover, movie fragments may enable simultaneous recording and playback of a file using a regular ISO file parser. Finally, a smaller duration of initial buffering may be required for progressive downloading, e.g., simultaneous reception and playback of a file, when movie fragments are used and the initial movie box is smaller compared to a file with the same media content but structured without movie fragments.

The movie fragment feature may enable splitting the metadata that conventionally would reside in the movie box into multiple pieces. Each piece may correspond to a certain period of time for a track. In other words, the movie fragment feature may enable interleaving file metadata and media data. Consequently, the size of the movie box may be limited and the use cases mentioned above be realized.

In some examples, the media samples for the movie fragments may reside in an mdat box, as usual, if they are in the same file as the moov box. For the metadata of the movie fragments, however, a moof box may be provided. The moof box may include the information for a certain duration of playback time that would previously have been in the moov box. The moov box may still represent a valid movie on its own, but in addition, it may include an mvex box indicating that movie fragments will follow in the same file. The movie fragments may extend the presentation that is associated to the moov box in time.

Within the movie fragment there may be a set of track fragments, including anywhere from zero to a plurality per track. The track fragments may in turn include anywhere from zero to a plurality of track runs, each of which document is a contiguous run of samples for that track. Within these structures, many fields are optional and can be defaulted. The metadata that may be included in the moof box may be limited to a subset of the metadata that may be included in a moov box and may be coded differently in some cases. Details regarding the boxes that can be included in a moof box may be found from the ISO base media file format specification.

A sample grouping in the ISO base media file format and its derivatives, such as the AVC file format and the SVC file format, may be defined as an assignment of each sample in a track to be a member of one sample group, based on a grouping criterion. A sample group in a sample grouping is not limited to being contiguous samples and may contain non-adjacent samples. As there may be more than one sample grouping for the samples in a track, each sample grouping has a type field to indicate the type of grouping. Sample groupings are represented by two linked data structures: (1) a SampleToGroup box (sbgp box) represents the assignment of samples to sample groups; and (2) a SampleGroupDescription box (sgpd box) contains a sample group entry for each sample group describing the properties of the group. There may be multiple instances of the SampleToGroup and SampleGroupDescription boxes based on different grouping criteria. These are distinguished by a type field used to indicate the type of grouping.

The sample group boxes (SampleGroupDescription Box and SampleToGroup Box) reside within the sample table (stbl) box, which is enclosed in the media information (minf), media (mdia), and track (trak) boxes (in that order) within a movie (moov) box. The SampleToGroup box is allowed to reside in a movie fragment. Hence, sample grouping can be done fragment by fragment.

Image sequences, which may also be referred to as image bursts, may be obtained with various means or may be used for various purposes, including but not limited to one or more of the following:

An image sequence may represent sequentially captured pictures, e.g. using burst photography or such.

An image sequence may represent a focal stack, an exposure stack, or such, where the camera may be considered to be held approximately stationary and the capturing parameters have differed between pictures of the image sequence.

An image sequence may represent a panorama where the camera has been panned (or such) and time- and/or translation-wise approximately equal distant pictures have been shot during the camera movement.

An image sequence may represent an animation or a cinemagraph. A cinemagraph may be defined as a still picture in which a minor and repeated movement occurs.

Image sequences can be compressed either as sequences of still pictures coded with spatial prediction means or inter pictures coded with spatial and temporal prediction means. Image sequences with random access and support for editing individual pictures have been traditionally enabled by representing the sequence as a series of independently coded intra pictures. Such formats include, for example, Motion JPEG, animated GIF and the Intra profiles of H.264.

If a sequence of images is represented as a series of still pictures, the coding efficiency is typically poor and the file size requirement for a high resolution sequence can become massive. In the case a sequence is coded as a video with temporal prediction, there are strict limitations on how the sequence needs to be decoded, how it can be played back and issues when user wants to edit some of the images in the sequence.

A container file may contain content, such as media data, and metadata related to the content. A container file may be used to identify and interleave different data types. A multimedia container file may for example contain audio, video and images. A multimedia container file may be used as an element used in the chain of multimedia content production, manipulation, transmission and consumption. There may be substantial differences between a coding format (also known as an elementary stream format or a bitstream format) and a container file format. The coding format may relate to the action of a specific coding or compression algorithm that codes the content information into a bitstream. The container file format may specify syntax and semantics for organizing the generated bitstream or bitstreams in such way that it can e.g. be accessed for local decoding and playback, transferred as a file, or streamed, all utilizing a variety of storage and transport architectures. Furthermore, the file format may facilitate interchange and editing of the media as well as recording of received real-time streams to a file.

The ISO base media file format specifies a generic structure for the storage and transport of timed media such as audio, video, and teletext. Recently, work has been initiated towards extending ISOBMFF's capabilities to enable the handling of still images and image sequences also. To enable storage and transport of image sequences, the image file format has been defined in ISO/IEC 23008-12 also known as MPEG-H Part 12, the definition being based on the ISO base media file format.

The formats defined in ISO/IEC 23008-12 enable the interchange, editing, and display of images coded using High Efficiency Video Coding (HEVC) or any other image or video codec, and the carriage of metadata associated with those images. The image file format builds on tools defined in the ISO Base Media File Format to define an interoperable storage format for single images, collections of images, and sequences of images. The image file format includes a structural brand that does not constrain the codec used to code images stored in the file and HEVC-based brands that require the use of the HEVC for the coded images.

The use of the HEVC video coder to encode still images is supported by the image file format to cover the storage of single images, and collections of independently coded images, as well as the storage of image sequences, with timing that is optionally used at the player and/or decoder, and in which the images may be dependent on other images.

A file conforming to the image file format may include both still images and image sequences, enabling a single file to be constructed to meet a variety of needs (e.g. a single image for printing, and a record of the image burst that was used to synthesize that image). In general, the still image support is used for cases such as when neither timing nor inter-picture coding dependency are required. If timing or other tools from the ISO Base Media File Format available for tracks are needed (e.g. a simple animated image), or pictures have been coded with inter-picture coding dependency, then an image sequence, stored as a track, may be used.

For the storage of image sequences the track structure of ISOBMFF is used. However, in order to discriminate between video and image sequences a new handler called 'pict' has been defined. The samples (visual access units) themselves are stored in the 'mdat' box and/or in one or more files separate from the file formatted according to the image file format. The sample table box 'stbl' records the location, length, and the decoding order of the samples. The codec specific initialization information is carried in the sample description box 'stsd'.

ISOBMFF and its derived specifications are designed to properly transmit, edit, decode and present timed media contents. Timed media content are associated with a decoding and presentation order, and this order is made aware to the client using ISOBMFF. For e.g. all coded samples are stored in decoding order and each sample could be given a unique composition time in the media time-line; if a composition time is not associated with a sample then the client may implicitly assume that the decode time is also the composition time.

Each sample of the coded image sequence may be random accessible with some maximum tolerable delay. Some samples may be intra coded, whereas some samples may use other samples as reference. When predictive coding is used for a sample to be random-accessed, all direct and indirect reference samples may have to be decoded prior to decoding the sample to be random-accessed.

In ISOBMFF there is a box called the independent and disposable samples: the 'sdtp' box. The box records for each sample if the sample (a) depends on other samples for decoding (b) is used by other samples as reference, and (c) is the sample redundantly coded. The usage of this box as documented by the ISOBMFF specification is to identify those samples that are independently decodable when performing trick mode operation or to identify random access recovery points and rolling forward discarding non-reference samples until the point when decoded samples need to be presented. Random access to any sample is not guaranteed to use only its reference samples.

A file player may be defined as software, hardware, or a combination thereof that parses, decodes, and renders (e.g. displays) a container file. A file parser, which may also be called a file reader, may be defined software, hardware, or a combination thereof that parses structures of a container file and may provide media data for one or more decoders for decoding.

A file recorder may be defined as software, hardware, or a combination thereof that captures or obtains media content, encodes media content into one or more bitstreams, and encapsulates the one or more bitstreams into a container file. A file creator, which may also be called a file writer, may be defined as software, hardware, or a combination thereof that encapsulates one or more bitstreams into a container file. A file creator may additionally create and include metadata into a container file.

In order to access a predicted picture, the decoder, the file player, the file parser, or some other entity needs to conclude which reference pictures are required to be decoded first. The delay may be significantly reduced, if only those pictures that are used as reference are decoded rather than decoding all pictures starting from the previous IDR picture or alike.

Therefore it is desired to introduce improved methods for identifying pictures that are required to be decoded in order to decode a desired random-accessed picture correctly.

Now in order to enhance the enablement of random access, an improved method for signaling reference pictures or file format samples comprising reference pictures is presented hereinafter. Hereinafter, term sample is used to refer to a file format sample rather than a sample of a sample array of a picture.

Many embodiments comprise the following:
assigning an identifier to at least each reference picture;
indicating, in a file, the number and, if any, the identifiers of the reference pictures of inter coded pictures;
assigning an index to each unique combination of the identifier and the number and, if any, the identifiers of the reference pictures of inter coded pictures;
indicating, in the file, mappings of pictures to said indices.

Many embodiments comprise the following:
parsing, from a file, a mapping of a picture to an index;
parsing, from the file, a combination, corresponding to the index, of an identifier and the number and, if the picture is an inter coded picture, the identifiers of the reference pictures of the picture;
resolving, based on the identifiers of the reference pictures of the picture, the reference pictures of the picture.

Figure 6:
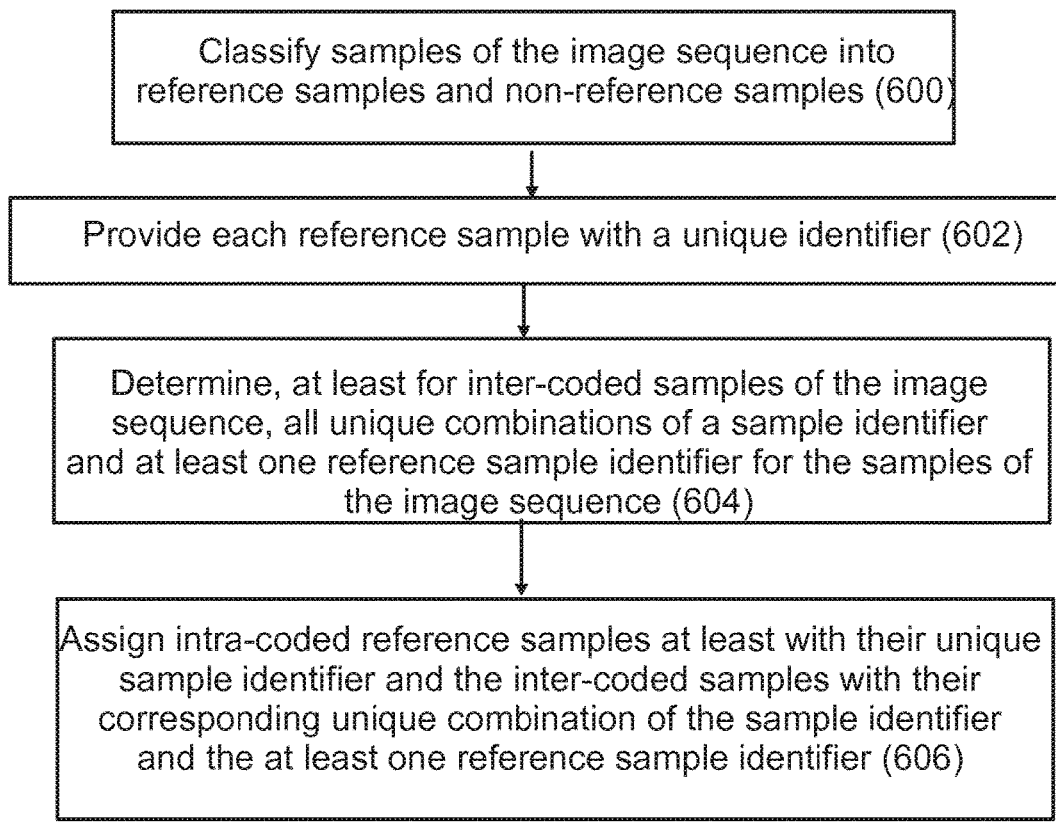
FIG. 6 shows a flow chart of a process for signalling the reference samples required for decoding a sample according to an embodiment of the invention.

An embodiment relates to a method for signaling reference samples of an image sequence to be encoded in a bitstream or equivalently for signaling reference samples of an encoded image sequence to be encapsulated in a container file as disclosed in FIG. 6. The method comprises classifying samples of the image sequence into reference samples and non-reference samples (600); providing each reference sample with a unique identifier (602); determining, at least for inter-coded samples of the image sequence, all unique combinations of a sample identifier and at least one reference sample identifier for the samples of the image sequence (604), where the at least one reference sample identifier for a particular sample identifies all samples that refer to said sample; and assigning intra-coded reference samples at least with their unique identifier and the inter-coded samples with their corresponding unique combination of the sample identifier and the at least one reference sample identifier (606).

According to an embodiment, the intra-coded reference pictures may be assigned with reference sample identifiers having the same value as their unique identifiers.

According to an embodiment, each non-reference sample may be provided with a common identifier.

Alternatively to providing each reference sample with a unique identifier and each non-reference sample with a common identifier, the method may comprise providing each sample an indication whether the sample is a reference sample or a non-reference sample and providing each reference sample with a unique identifier.

Thus, the above procedure enables to identify only those samples that are used as reference for decoding a predicted image sample, thereby providing a compact mechanism to inform a file reader the samples that are required to be decoded in order to decode any sample in the image sequence. This in turn enables random access into any sample of the coded image sequence.

According to an embodiment, the reference samples comprise intra coded samples and/or inter coded reference samples. From the perspective of an image sequence, samples can be classified into one of four classes: (a) Intra coded reference samples, (b) Intra coded non-reference samples, (c) Inter coded reference samples, and (d) Inter coded non-reference samples. An Intra coded reference sample does not require any other samples to be decoded for it to be correctly decoded. An Inter coded reference sample requires at least one Intra coded reference sample or at least one Inter coded reference sample to be decoded before it can be decoded. Intra coded non-reference samples are similar to Intra coded reference samples except that they themselves are not used as a reference for any other sample. Inter coded non-reference samples are similar to Inter coded reference samples except that they themselves are not used as a reference for any other sample.

Both the Intra coded reference samples and the Intra coded non-reference samples form a special case in that sense that they do not require any other samples to be decoded for them to be correctly decoded. This provides various options how the Intra coded reference samples and the Intra coded non-reference samples are handled in the signaling.

As described above, the intra-coded reference samples may be provided only with their unique identifier, or alternatively also with reference sample identifiers having the same value as their unique identifiers.

According to an embodiment, the Intra coded non-reference samples are not included in the signaling. Since the Intra coded non-reference samples are not used as a reference for any other sample, they can be left out from the signaling.

According to an alternative embodiment, the Intra coded non-reference samples are included in the signaling such that they are provided with the same common identifier as other non-reference samples. According to a further embodiment, the Intra coded non-reference samples are not provided with any reference sample identifiers.

In some embodiments, all Intra coded samples are treated as reference samples and hence both Intra coded samples and Inter coded reference samples may be considered reference samples.

According to an embodiment, the unique identifier for each reference sample is a positive non-zero integer and the common identifier for the non-reference samples is zero. This provides a straightforward method for identifying the reference samples unambiguously, and for differentiating the reference samples from the non-reference samples.

According to an embodiment, for intra coded samples, the sample identifier and the reference sample identifier are the same.

According to an embodiment, the method further comprises determining the unique identifier for each reference sample from a pool of integer values within a range where all intra coded samples and inter coded reference samples are assignable with different identifier values. Thus, the range of the integer values may be determined on the basis of the number of the reference samples in the image sequence such that all reference samples of the image sequence can be identified uniquely; i.e. no two reference samples in the same track is allowed to have the same sample identifier value. In some embodiments, a file may include exactly one image sequence and hence all references samples included in the file can be identified uniquely.

According to an embodiment, the method further comprises assigning an index for each unique combination of the sample identifier and the at least one reference sample identifier; and mapping the samples to an index corresponding their combination of the sample identifier and the at least one reference sample identifier. It is noted herein that more than one non-reference sample may have the same combination of the sample identifier and at least one reference sample identifier, and therefore more than one sample may be mapped to the same index.

According to an embodiment, the method further comprises indicating said mapping in a container file that also comprises or refers to the bitstream.

According to an embodiment, the container file format complies with ISO Base Media File Format (ISOBMFF), the container file comprising a track that logically comprises samples, and a sample of the track comprises a picture, the method comprising including a unique combination of the picture identifier and zero or more reference picture identifiers as a sample group description entry in the container file, sample group description entry being assigned with the respective index; and including, in the container file, an indication within a sample-to-group data structure that a picture is mapped to the respective index of the sample group description entry.

The ISOMBFF provides a sample grouping mechanism that can be used in the embodiment. It enables the sample grouping mechanism in the form of two linked box data structures: (a) the SampleToGroupBox, and (b) the SampleGroupDescriptionBox. The SampleToGroup box represents the assignment of samples to sample groups and a SampleGroupDescription box contains sample group description entries for each sample group describing the properties of the group.

According to an embodiment, a new visual sample group entry, which may for example be called the ReferencedSamplesList ('refs'), is defined for ISOBMFF. This sample group entry comprises at least the fields: (a) sample identifier, which may for example have the syntax element name sample_id, and (b) a list of reference sample identifiers, which may for example have the syntax element name reference_sample_id. As mentioned above, all reference samples in the image sequence are given a non-zero positive integer identifier. Non-reference samples that refer to other samples are assigned a common identifier value of zero. The list of reference_sample_id values is a list of sample_id values that the sample with sample_id refers to. In some embodiments, the list of reference_sample_id values may also include the sample_id value of the current sample, and thus for an Intra coded reference sample only one value is coded into the reference_sample_id list and this value is the same as the sample_id of said Intra coded reference sample.

In an embodiment, for implementing the indication of reference and non-reference samples as an ISO base media file format, a file creator compiles all unique combinations of sample_id and reference_sample_id list, the values of a unique combination are collated in a 'refs' sample group entry, and the 'refs' sample group entries are inserted as a list into the 'refs' sample group description box. Each sample in the image sequence is then mapped to the appropriate sample group entry using the sample to group box. In some embodiments, non-reference Intra coded samples will not belong to any entry in this sample group entry list and hence will have their group description index value set to zero.

The syntax and semantics of the 'refs' sample group description entry may be implemented, for example, as follows:

```
Syntax
class ReferencedSamplesList( )
extends VisualSampleGroupEntry ('refs') {
        unsigned int(32) sample_id;
        unsigned int(8) num_referenced_samples;
        for (i = 0; i < num_referenced_samples; i++) {
               unsigned int(32)reference_sample_id;
        }
}
```

It should be understood that other embodiments may be similarly realized with similar or equivalent syntax structures. For example, the syntax element lengths may be changed in other embodiments, e.g. from unsigned int(32) to unsigned int(64).

Semantics sample_id: The value of this field may be required to be a positive integer. When the sample referring to the sample description group entry is a reference sample, the value of this field may be required to be a non-zero positive integer. The value for this field may be required to be zero when the sample belonging to this group is a non-reference picture.

num_referenced_samples: The number of direct reference samples required for decoding a predicted sample. The value of this field shall be set to one for a group that is a collection of intra coded samples.

reference_sample_id: The value of this field shall be set to the sample_id values of the direct reference samples that a sample belonging to this group is predicted from. Sample group entries that record Intra coded reference sample, shall have this value set to the same value as recorded by the sample_id in this sample group entry.

Alternatively, the semantics of num_referenced_samples and reference_sample_id may be specified as follows:

num_referenced_samples: The number of direct reference samples required for decoding a predicted sample. For Intra coded samples, num_referenced_samples is 0.

reference_sample_id: The value of this field shall be set to the sample_id values of the direct reference samples that a sample belonging to this group is predicted from.

The use of the 'refs' sample grouping is illustrated more in detail in the following examples.

FIG. 7a shows a coded image sequence where the samples are shown in the presentation order. The prediction dependencies between samples are indicated by arrows. The 'I' in the figures indicate that the sample is Intra coded, while the 'P' indicate that the sample is predicted from a single reference sample. For example, the samples P1, P2 and P3 are predicted from the Intra coded sample I0, which is thus the reference sample for the samples P1, P2 and P3. The samples P5, P6 and P7 are, in turn, predicted from the Intra coded sample I4, which has the presentation order after the samples P5, P6 and P7 but is nevertheless the reference sample for the samples P5, P6 and P7. FIG. 7b shows the coded image sequence in decoding order where the prediction dependencies have been taken into account.

The samples of coded image sequence are classified into reference samples, i.e. samples {I0, I4}, and non-reference samples, i.e. {P1, P2, P3, P5, P6, P7}. Applying the rules set above, all reference samples are given a unique identifier, and all non-reference Inter coded samples have their identifier set to zero. In this example, the positive non-zero identifiers for reference samples start from 101. Therefore, using the rule for setting the identifiers, the sample/sample identifier pairs are:

{(I0, 101), (I4, 102), (P1, 0), (P2, 0), (P3, 0), (P5, 0), (P6, 0), (P7, 0)}.

Next, using the rules for constructing the reference_sample_id list, first the case where the value for reference_sample_id for Intra coded samples is the same as the sample_id itself needs to be taken into account. Therefore, the set of sample/reference_sample_id list pairs for the Intra coded samples in this sequence is:

{(I0, 101), (I4, 102)}.

For all other samples the reference_sample_id records the samples that it refers to. Therefore, the set of sample/reference_sample_id list pairs for the rest of the samples is:

{(P1, 101), (P2, 101), (P3, 101), (P5, 102), (P6, 102), (P7, 102)}.

The above is summarized in the table of FIG. 8, where the samples are listed with their sequence numbers in encoding/decoding order, the type of sample, sample_id associated with the sample, and the list of reference_sample_id for each of the samples.

From this list, all unique combinations of a sample identifier and at least one reference sample identifier for the samples of the image sequence can be determined. The table of FIG. 8 comprises four unique sample_id/reference_sample_id combinations: {(101, 101), (0, 101), (102, 102), (0, 102)}.

The unique combinations of sample_id/reference_sample_id list pairs are collected as a list of visual sample group entries 'refs' and inserted into the sample group description box providing indices (Idx) for the entries. The table of FIG. 9a shows the list of four unique sample_id-reference_sample_id combinations which are coded as 'refs' entries in the sample group description box. Finally, all samples are assigned with their corresponding unique combination of the sample identifier and the at least one reference sample identifier. FIG. 9b illustrates the mapping of the samples in the image sequence to the group description indices of the sample group entries recorded in the constructed 'refs' sample group.

FIG. 10a shows another coded image sequence where the samples are shown in the presentation order. In addition to Intra coded 'I' samples and single reference 'P' samples, the image sequence comprises 'B' samples, which are coded as bi-predicted from two reference samples. Herein, the samples P1 and P2 are predicted from the Intra coded sample I0, the samples P4 and P7 are, in turn, predicted from the Intra coded sample I3, and the samples B5 and B6 are both bi-directionally predicted from the samples P2 and P4. FIG. 10b shows the coded image sequence in decoding order where the prediction dependencies have been taken into account.

The samples of coded image sequence are classified into reference samples, i.e. Intra coded samples {I0, I3} and Inter coded reference samples {P2, P4}, and non-reference samples, i.e. {P1, B5, B6, P7}. Applying the rules set above, all reference samples are given a unique identifier, and all non-reference Inter coded samples have their identifier set to zero. Again in this example, the positive non-zero identifiers for reference samples start from 101. Applying the rules set above, the set of sample/sample_id pairs is:

{(I0, 101), (P1, 0), (P2, 102), (I3, 103), (P4, 104), (B5, 0), (B6, 0), (P7, 0)}.

The set of sample-reference_sample_id list pairs for the samples is:

{(I0, 101), (P1, 101), (P2, 101), (I3, 103), (P4, 103), (B5, [102, 104]), (B6, [102, 104]), (P7, 103)}.

Figures 11, 12A, 12B:
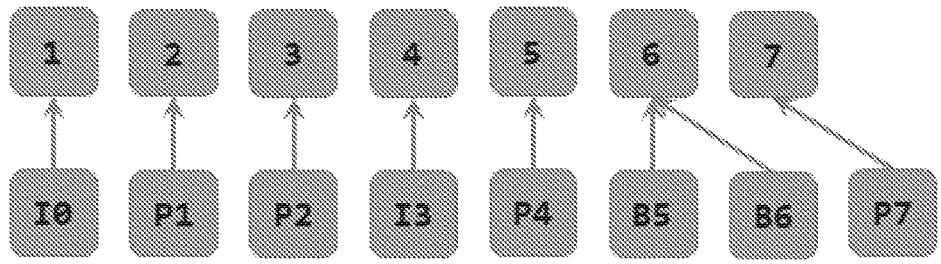
FIG. 11 shows a table listing samples of FIGS. 10a and 10b according to their sample_id, and the list of reference_sample_id.
FIG. 12a shows a list of unique sample_id-reference_sample_id combinations of samples of FIGS. 10a and 10b.
FIG. 12b shows mapping of the samples to group description index in the sample to group box according to an embodiment of the invention.

This information is summarized in the table of FIG. 11, where the samples are listed with their sequence numbers in encoding/decoding order, the type of sample, sample_id associated with the sample, and the list of reference_sample_id for each of the samples.

From this list, all unique combinations of a sample identifier and at least one reference sample identifier for the samples of the image sequence can be determined. The table of FIG. 11 comprises seven unique sample_id/reference_sample_id combinations: {(101, 101), (0, 101), (102, 101), (103, 103), (104, 103), (0, [102, 104]), (0, 103)}.

Again, the unique combinations of sample_id/reference_sample_id list pairs are collected as a list of visual sample group entries 'refs' and inserted into the sample group description box providing indices (Idx) for the entries. The table of FIG. 12a shows the list of seven unique sample_id-reference_sample_id combinations which are coded as 'refs' entries in the sample group description box. Finally, all samples are assigned with their corresponding unique combination of the sample identifier and the at least one reference sample identifier. FIG. 12b illustrates the mapping of the samples in the image sequence to the group description indices of the sample group entries recorded in the constructed 'refs' sample group.

The method can be implemented in multiple ways. For example, it is apparent that the described processing steps may be performed in different order. Moreover, there may be one or more ways to indicate reference pictures and/or non-reference pictures. There may also be one or more ways to cause the decoding process to treat a picture as a reference picture and/or a non-reference picture.

Figure 13:
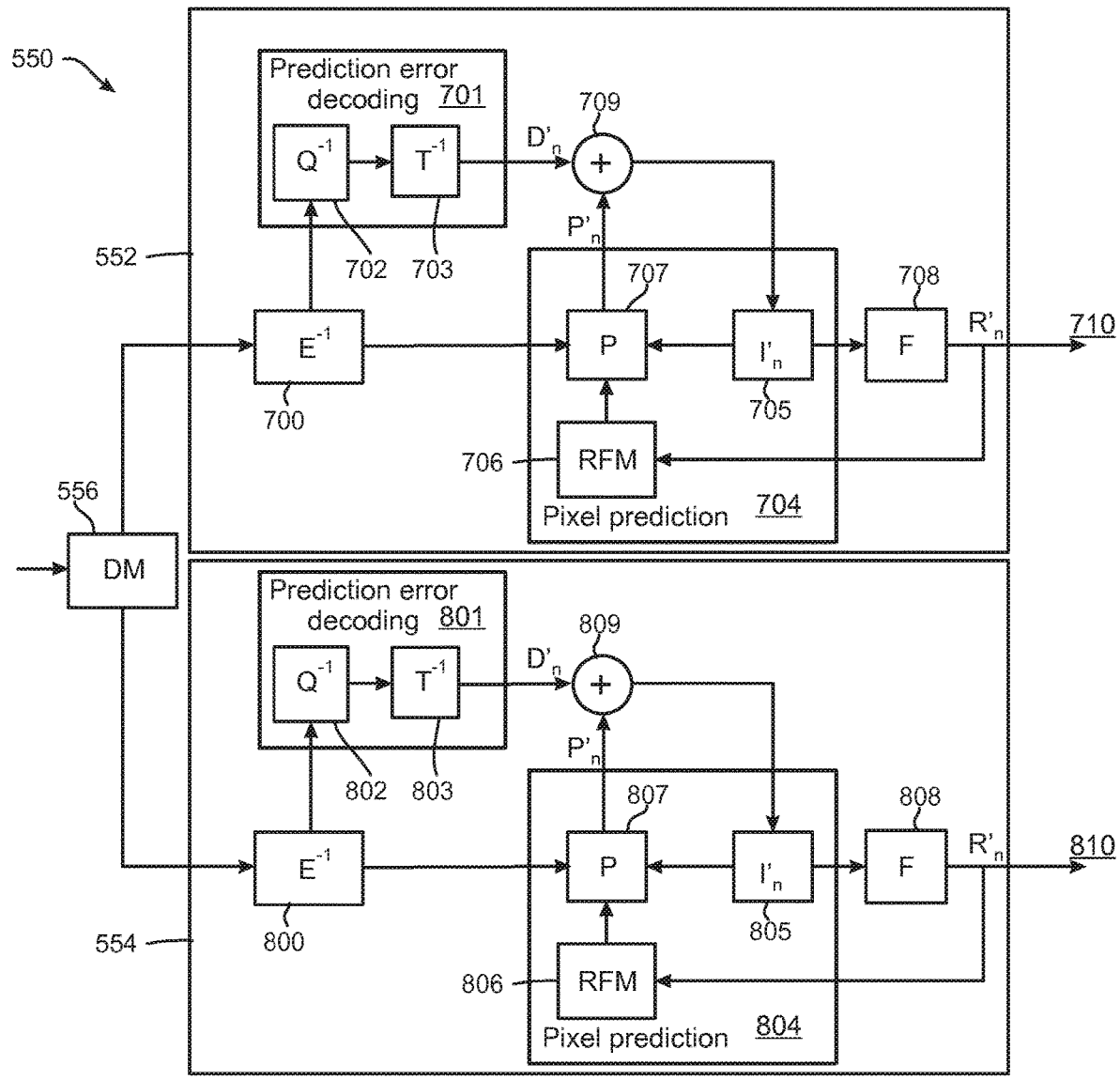
FIG. 13 shows a schematic diagram of a decoder suitable for implementing some embodiments of the invention.

Another embodiment describes operation of the decoder when it receives the encoded bitstream. FIG. 13 shows a block diagram of a video decoder suitable for employing embodiments of the invention. FIG. 13 depicts a structure of a two-layer decoder, but it would be appreciated that the decoding operations may similarly be employed in a single-layer decoder.

The video decoder 550 comprises a first decoder section 552 for base view components and a second decoder section 554 for non-base view components. Block 556 illustrates a demultiplexer for delivering information regarding base view components to the first decoder section 552 and for delivering information regarding non-base view components to the second decoder section 554. Reference P'n stands for a predicted representation of an image block. Reference D'n stands for a reconstructed prediction error signal. Blocks 704, 804 illustrate preliminary reconstructed images (I'n). Reference R'n stands for a final reconstructed image. Blocks 703, 803 illustrate inverse transform ($T^{-1}$). Blocks 702, 802 illustrate inverse quantization ($Q^{-1}$). Blocks 701, 801 illustrate entropy decoding ($E^{-1}$). Blocks 705, 805 illustrate a reference frame memory (RFM). Blocks 706, 806 illustrate prediction (P) (either inter prediction or intra prediction). Blocks 707, 807 illustrate filtering (F). Blocks 708, 808 may be used to combine decoded prediction error information with predicted base view/non-base view components to obtain the preliminary reconstructed images (I'n). Preliminary reconstructed and filtered base view images may be output 709 from the first decoder section 552 and preliminary reconstructed and filtered base view images may be output 809 from the first decoder section 554.

Figure 14:
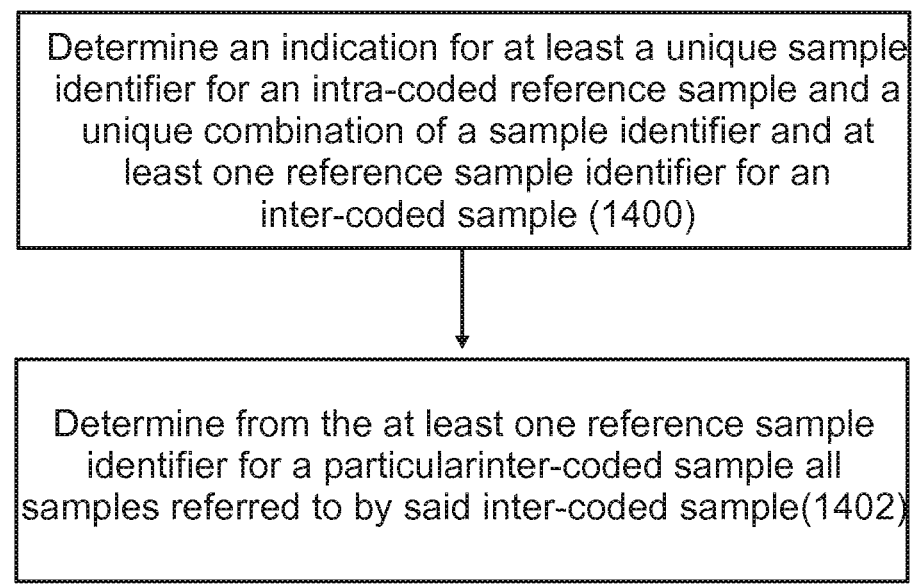
FIG. 14 shows a flow chart of a process for determining the reference samples required for decoding a sample according to an embodiment of the invention

The decoding operations, as such, may be carried out as conventionally known. However, before starting the decoding of the samples in the encoded image sequence, a file reader preferably determines the reference samples required for decoding a sample from the signaling. In such a method, shown in FIG. 14, an indication for at least a unique sample identifier is determined for an intra-coded reference sample and a unique combination of a sample identifier and at least one reference sample identifier is determined for an inter-coded sample (1400), and from the at least one reference sample identifier for a particular inter-coded sample all samples that refer to said inter-coded sample are determined (1402).

The process of a file reader determining the reference samples required for decoding a sample from the signaling may be illustrated by referring to the example described in FIGS. 10-12. Let us consider the sample B5 in the example. B5 has been mapped to the sixth entry of the 'refs' sample group through the group_description_index (Idx=6) of the sample to group box. The fields of this 'refs' sample group entry determine sample_id=0 and reference_sample_id list= [102, 104]. From the value of the field sample_id=0 it can be concluded that the sample belonging to this group is not used as a reference by any other sample in the image sequence. The reference_sample_id list gives the direct references to the samples required for decoding the sample B5, i.e. the samples with sample_id values 102 and 104. The file reader then proceeds to check in the sample group description box for sample_id=102 and finds that the sample_id 101 is in the reference_sample_id list of sample_id 102. This sample_id is added to the list of sample_ids required for decoding the sample B5, the list now being [101, 102, 104]. Since the value of reference_sample_id list (101) is the same as the value of sample_id (101), the file reader concludes that this is a group of Intra coded samples and no further reference samples need to be searched for in this path.

The file reader also checks the sample group description box for sample_id 104 and finds that it references the sample_id 103, which is added to the list of sample_ids required for decoding the sample B5. Again the file reader concludes that this is a group of Intra coded samples (because the reference_sample_id list is the same as the sample_id) and stops searching for further reference samples. The list of samples to be decoded for this group is now is samples with sample_ids in the list [101, 102, 103, 104]. The samples mapped to the entries of the 'refs' sample group through the group_description_index with these sample_ids are all the direct and indirect reference pictures for the sample B5. In other words, to decode B5 the samples {I0, P2, I3 and P4} are required to be decoded.

The decoder may be further arranged to decode the indications regarding to a decoding order, to a displaying order, or to a combination of a decoding order and a displaying order as described above, and arranged to control the operation of the decoder and the apparatus comprising the decoder to construct the decoded image sequence accordingly.

A directed acyclic graph may be defined as a directed graph with no directed cycles. A directed acyclic graph may be considered to be formed by a collection of vertices and directed edges, each edge connecting one vertex to another, such that there is no way to start at some vertex v and follow a sequence of edges that eventually loops back to v again.

According to an embodiment, a method, which may implemented e.g. by a file creator, may form a directed acyclic graph according the inter prediction dependencies of pictures of an image sequence. Nodes (a.k.a. vertices) represent pictures and directed edges represent prediction dependencies with the reference picture for prediction in the source of the directed edge and the predicted in the destination of the directed edge. Each intra coded picture is a root node. The graph may be a forest, i.e. may be comprised of more than one tree. The method may assign a branch identifier for each node. The branch identifier of the first picture in decoding order may be assigned first, and the branch identifiers may be assigned for each picture in decoding order.

The branch identifier value for a reference picture may be determined as follows:
- If a reference picture refPicA refers, in inter prediction, reference pictures refPicSetA having the same branch identifier value with each other and if there is no subsequent picture, in decoding order, that refers to at least some of the reference pictures refPicSetA but does not refer to refPicA, the branch identifier value of refPicA is set equal to the branch identifier value of the reference pictures refPicSetA.
- Otherwise, the branch identifier value of refPicA is assigned a value that has been previously unallocated or unused.

The branch identifier value for a non-reference picture may be determined as follows:
- If a non-reference picture nonRefPicA refers to reference pictures refPicSetB and there is an earlier non-reference picture nonRefPicB, in decoding order, referring to the same reference picture refPicSetB, the branch identifier value of the non-reference picture nonRefPicA is set equal the branch identifier value of the non-reference picture nonRefPicB.
- Otherwise, the branch identifier value of nonRefPicA is assigned a value that has been previously unallocated or unused.

According to an embodiment, the method further comprises assigning an index for each unique combination of the branch identifier, and a flag indicating reference or non-reference picture. Alternatively, the method further comprises assigning an index for each unique branch identifier and the method also comprises encoding or writing metadata in a container file for the bitstream that indicates reference and non-reference pictures.

According to an embodiment, the container file format is ISO Base Media File Format (ISOBMFF), wherein the output pictures are indicated with a sample grouping mechanism such that a sequence or a set of images is stored using a track structure of ISOMBFF.

According to an embodiment, a new visual sample group entry, which may for example be called the Dependency Tree ('dptr'), is defined for ISOBMFF. This sample group entry comprises at least the fields: (a) a branch identifier, which may for example have the syntax element name branch_id; (b) a list of referenced branch identifier values (e.g. with the syntax element name reference_branch_id) identifying pictures that may be used as a reference for a picture mapped to this sample group description entry; (c) a flag, which may for example have the syntax element name ref_pic_flag, indicating if the mapped sample is a reference picture.

In an embodiment, for implementing the indication of reference and non-reference samples as an ISO base media file format, a file creator compiles all unique sample group description entries of type 'dptr', and the 'dptr' sample group entries are inserted as a list into the 'dptr' sample group description box. Each sample in the image sequence is then mapped to the appropriate sample group entry using the sample to group box. In some embodiments, non-reference Intra coded samples will not belong to any entry in this sample group entry list and hence will have their group_description_index value set to zero.

The syntax of the 'dptr' sample group description entry may be implemented, for example, as follows:

```
class DependencyTreeEntry( )
extends VisualSampleGroupEntry ('dptr') {
    unsigned int(1) ref_pic_flag;
    unsigned int(31) branch_id;
    unsigned int(8) num_references;
    for (i = 0; i < num_references; i++) {
        unsigned int(1) reserved;
        unsigned int(31) reference_branch_id;
    }
}
```

It should be understood that other embodiments may be similarly realized with similar or equivalent syntax structures. For example, the syntax element lengths may be changed in other embodiments. In another example, another flag, which may be referred to as first_sample_flag, is included in the sample group description entry syntax, and num references and reference_branch_id are present only if first_sample_flag is equal to 1, and only the first sample, in decoding order, with a particular branch_id value is mapped to a sample group description entry with first_sample_flag equal to 1.

In an embodiment, a method, which may be implemented for example in a file player, comprises the following to perform random access to a particular picture, i.e. to decode the particular picture starting from a situation where no earlier picture has been decoded or when decoding has been re-initialized.

First, if the sample is a sync sample, it is decoded right away and no further processing is needed. Otherwise, the branch identifier and ref_pic_flag (or alike) for the particular picture are concluded based on the information stored in the file, e.g. by finding the sample group description index (of the grouping of type 'dptr') corresponding to the sample (that corresponds to the particular picture). From the sample group description index, the corresponding sample group description entry is located from the sample group description box for the grouping of type 'dptr'. The branch identifier and ref_pic_flag (or alike) are found from the sample group description entry.

Second, a list of branch_id values decBranchIdList for reference pictures to be decoded is derived by investigating sample group description entries of the sample grouping of type 'dptr'. The branch_id of the random-accessed picture is first included in the list decBranchIdList. The following process is recursively executed with the initial input being the branch_id value of the random-accessed picture:
- The sample group description entries are investigated. For each sample group description entry having a reference_branch_id equal to the branch_id value given as input to the process, the branch_id value given as input to the process is included in the decBranchIdList (unless it already was present in the decBranchIdList) and the process is recursively repeated by giving as input branch_id value the branch_id value of the found sample group description entry.

Third, all the reference samples preceding the random-accessed sample, in decoding order, and being mapped to a branch_id value (using the 'dptr' sample grouping) equal to a value in the list DecBranchIdList are decoded. After that, the random-accessed sample is decoded.

In an embodiment, which may be applied together with or independently of any other embodiment, there is a method that comprises:

determining or obtaining an inter prediction pattern for an image sequence, wherein the inter prediction pattern provides information which pictures are intra coded, which pictures are inter coded, which pictures are reference pictures, which pictures are non-reference pictures, and which pictures may be used as a reference for predicting an inter coded picture, and wherein the pattern is repeated if the number of pictures to be coded is greater than the length of the pattern; and selecting parameters for encoding such that enable extracting any picture from the encoded bitstream together with its direct and indirect reference pictures in a manner that the extracted bitstream is conforming.

In an embodiment, an extracted bitstream may be considered conforming, when its decoding results into the same sample values (i.e. pixel values) as when the respective decoded samples when the entire bitstream is decoded, and when the output order of the pictures when decoding the extracted bitstream is the same as the output order of the respective pictures when the entire bitstream is decoded.

In an embodiment, the maximum POC value or equivalently the POC cycle length, which may be represented for example by the log2_max_pic_order_cnt_lsb_minus4 syntax element of the sequence parameter set of HEVC, is set in a manner that the POC of any picture when decoding the extracted bitstream is the same as the POC of the respective picture when decoding the entire bitstream.

In an embodiment, the method further comprises indicating with a first indication that an extracted bitstream is conforming, wherein the extracted bitstream is formed by extracting any picture from the encoded bitstream together with its direct and indirect reference pictures.

In an embodiment, said first indication is included in a container file that also includes or refers to the encoded bitstream.

In an embodiment, said first indication is the signaling reference samples of an image sequence, as described in other embodiments. When the signaling reference samples of an image sequence, as described in other embodiments, is present in a file, it is also imposed that an extracted bitstream is conforming, wherein the extracted bitstream is formed by extracting any picture from the encoded bitstream together with its direct and indirect reference pictures.

In an embodiment, said first indication is the signaling of branch identifiers and reference branch identifiers for pictures in an image sequence, as described in other embodiments. When the signaling branch identifiers and reference branch identifiers for pictures in an image sequence is present in a file, it is also imposed that an extracted bitstream is conforming, wherein the extracted bitstream is formed by extracting any picture from the encoded bitstream together with its direct and indirect reference pictures.

Thus, the methods described above provide means for signaling predictive coding structures that allow random access features with minimized delays and a possibility of editing individual pictures in a compressed image sequence.

Embodiments have been described with reference to the term reference sample. In some embodiments, a reference sample is regarded as a direct reference sample and hence is not an indirect reference sample. In other embodiments, a reference sample is a collective term for both direct and indirect references samples.

Embodiments have been described with reference to the term reference picture. In some embodiments, a reference picture is regarded as a direct reference picture and hence is not an indirect reference picture. In other embodiments, a reference picture is a collective term for both direct and indirect references pictures.

Some of the embodiments of the invention described above describe the codec in terms of separate encoder and decoder apparatus in order to assist the understanding of the processes involved. However, it would be appreciated that the apparatus, structures and operations may be implemented as a single encoder-decoder apparatus/structure/operation. Furthermore in some embodiments of the invention the coder and decoder may share some or all common elements.

Some of the embodiments of the invention described above describe a separate apparatus for file writing and for file reading in order to assist the understanding of the processes involved. However, it would be appreciated that the apparatus, structures and operations may be implemented as a single file write-reader apparatus/structure/operation. Furthermore in some embodiments of the invention the file writer and the file reader may share some or all common elements.

Although the above examples describe embodiments of the invention operating within a codec, a file player, or a file recorder within an electronic device, it would be appreciated that the invention as defined in the claims may be implemented as part of any video codec, any file player, or any file recorder. Thus, for example, embodiments of the invention may be implemented in a video codec, a file player, or a file recorder which may implement video coding, file playing, or file recording, respectively, over fixed or wired communication paths.

Thus, user equipment may comprise a video codec, a file player, or a file recorder such as those described in embodiments of the invention above. It shall be appreciated that the term user equipment is intended to cover any suitable type of wireless user equipment, such as mobile telephones, portable data processing devices or portable web browsers.

Furthermore elements of a public land mobile network (PLMN) may also comprise video codecs, file players, or file recorders as described above.

In general, the various embodiments of the invention may be implemented in hardware or special purpose circuits, software, logic or any combination thereof. For example, some embodiments may be implemented in hardware, while other embodiments may be implemented in firmware or software which may be executed by a controller, microprocessor or other computing device, although the invention is not limited thereto. While various embodiments of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs) and processors based on multi-core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

The invention claimed is:

1. A method for signaling reference pictures of a picture sequence encoded in a bitstream, the method comprising:
   classifying pictures of the picture sequence into reference pictures and non-reference pictures;
   providing each reference picture with a reference picture identifier, the reference picture identifier for each reference picture being a unique, positive non-zero integer;
   providing non-reference pictures with a common picture identifier;
   determining, at least for inter-coded pictures of the picture sequence, all unique combinations of both
      (i) the common picture identifier provided for a particular non-reference picture or a reference picture identifier provided for a particular reference picture, and
      (ii) at least one reference picture identifier that identifies all pictures that may be used as a reference for predicting said particular reference picture or said particular non-reference picture; and
   assigning intra-coded reference pictures at least with their reference picture identifier and the inter-coded pictures with their corresponding unique combination.

2. The method according to claim 1, the method further comprising:
   assigning, to the intra-coded reference pictures, reference picture identifiers having the same value as the reference picture identifiers for particular reference pictures.

3. The method according to claim 1, wherein the unique picture the common picture identifier for the non-reference pictures is zero.

4. The method according to claim 2, the method, further comprising:
   assigning an index for each unique combination of (i) the common picture identifier provided for a particular non-reference picture or the reference picture identifier provided for a articular reference picture, and (ii) the at least one reference picture identifier that identifies all pictures that may be used as a reference for predicting said particular reference picture or said particular non-reference picture; and
   mapping the pictures of the picture sequence to an index corresponding to said unique combination.

5. The method according to claim 4, the method further comprising:
   indicating said mapping in a container file that also comprises or refers to the bitstream.

6. The method according to claim 5, wherein the container file complies with ISO Base Media File Format (ISOBMFF), the container file comprising a track that logically comprises samples, and a sample of the track comprises a picture, the method further comprising:
   including a unique combination of (i) the common picture identifier provided for a particular non-reference picture or the reference picture identifier provided for a particular reference picture, and (ii) at least one reference picture identifier that identifies all pictures that may be used as a reference for predicting said particular reference picture or said particular non-reference picture, as a sample group description entry in the container file, the sample group description entry being assigned with the respective index; and
   including, in the container file, an indication within a sample-to-group data structure that a picture is mapped to the respective index of the sample group description entry.

7. An apparatus comprising:
   at least one processor and at least one memory, said at least one memory stored with code thereon, which when executed by said at least one processor, causes the apparatus to perform at least:
      classifying pictures of the picture sequence into reference pictures and non-reference pictures;
      providing each reference picture with a reference picture identifier, the reference picture identifier for each reference picture being a unique, positive non-zero integer;
      providing non-reference pictures with a common picture identifier;
      determining, at least for inter-coded pictures of the picture sequence, all unique combinations of both
         (i) the common picture identifier provided for a particular non-reference picture or a reference picture identifier provided for a particular reference picture, and
         (ii) at least one reference picture identifier that identifies all pictures that may be used as a reference for predicting said particular reference picture or said particular non-reference picture; and assigning intra-coded reference pictures at least with their reference picture identifier and the inter-coded pictures with their corresponding unique combination.

8. The apparatus according to claim 7, wherein said at least one memory further comprising code causing the apparatus to perform at least:
assigning, to the intra-coded reference pictures, reference picture identifiers having the same value as the reference picture identifiers for particular reference pictures.

9. The apparatus according to claim 7, wherein the common picture identifier for the non-reference pictures is zero.

10. The apparatus according to claim 8, wherein said at least one memory further comprising code causing the apparatus to perform at least:
assigning an index for each unique combination of (i) the common picture identifier or the reference picture identifier and (ii) the at least one reference picture identifier; and
mapping the pictures of the picture sequence to an index corresponding to their unique combination.

11. The apparatus according to claim 10, wherein said at least one memory further comprising code causing the apparatus to perform at least:
indicating said mapping in a container file that also comprises or refers to the bitstream.

12. The apparatus according to claim 11, wherein the container file complies with ISO Base Media File Format (ISOBMFF), the container file comprising a track that logically comprises samples, and a sample of the track comprises a picture, wherein said at least one memory further comprising code causing the apparatus to perform at least:
including a unique combination of (i) the common picture identifier or the reference picture identifier, and (ii) at least one reference picture identifier as a sample group description entry in the container file, the sample group description entry being assigned with the respective index; and
including, in the container file, an indication within a sample-to-group data structure that a picture is mapped to the respective index of the sample group description entry.

13. A non-transitory computer readable storage medium stored with code thereon for use by an apparatus, which when executed by a processor, causes the apparatus to perform:
classifying pictures of the picture sequence into reference pictures and non-reference pictures;
providing each reference picture with a reference picture identifier, the reference picture identifier for each reference picture being a unique, positive non-zero integer;
providing non-reference pictures with a common picture identifier;
determining, at least for inter-coded pictures of the picture sequence, all unique combinations of both
(i) the common picture identifier provided for a particular non-reference picture or a reference picture identifier provided for a particular reference picture, and
(ii) at least one reference picture identifier that identifies all pictures that may be used as a reference for predicting said particular reference picture or said particular non-reference picture; and assigning intra-coded reference pictures at least with their reference picture identifier and the inter-coded pictures with their corresponding unique combination.

14. A method comprising:
receiving signaling comprising indications for reference pictures required for decoding a picture of a picture sequence;
determining an indication for at least a reference picture identifier for an intra-coded reference picture that identifies all pictures that may be used as a reference for predicting a particular reference picture or a particular non-reference picture and a unique combination for an inter-coded picture of both
(i) a common picture identifier or a reference picture identifier, and
(ii) at least one reference picture identifier, the reference picture identifier for the intra-coded reference picture being a positive non-zero integer;
determining an indication for the common picture identifier associated with a plurality of non-reference pictures; and
determining from the at least one reference picture identifier for a particular inter-coded picture all pictures referred to by said particular inter-coded picture.

15. A method according to claim 14, further comprising:
obtaining a request for random-accessing said particular inter-coded picture;
decoding said all pictures referred to by said particular inter-coded picture; and
decoding said particular inter-coded picture.

16. An apparatus comprising:
at least one processor and at least one memory, said at least one memory stored with code thereon, which when executed by said at least one processor, causes the apparatus to perform at least:
receiving signaling comprising indications for reference pictures required for decoding a picture of a picture sequence;
determining an indication for at least a reference picture identifier for an intra-coded reference picture that identifies all pictures that may be used as a reference for predicting a particular reference picture or a particular non-reference picture and a unique combination for an intra-coded picture of both
(i) common picture identifier or a reference picture identifier, and
(ii) at least one reference picture identifier, the reference picture identifier for the intra-coded reference picture being a positive non-zero integer;
determining an indication for the common picture identifier associated with a plurality of non-reference pictures; and
determining from the at least one reference picture identifier for a particular inter-coded picture all pictures referred to by said particular inter-coded picture.

17. The apparatus according to claim 16, wherein said at least one memory further comprising code causing the apparatus to perform at least:
obtaining a request for random-accessing said particular inter-coded picture;
decoding said all pictures referred to by said particular inter-coded picture; and
decoding said particular inter-coded picture.

18. A non-transitory computer readable storage medium stored with code thereon for use by an apparatus, which when executed by a processor, causes the apparatus to perform:
- receiving signaling comprising indications for reference pictures required for decoding a picture of a picture sequence;
- determining an indication for at least a reference picture identifier for an intra-coded reference picture that identifies all pictures that may be used as a reference for predicting a particular reference picture or a particular non-reference picture and a unique combination for an inter-coded picture of both
  - (i) common picture identifier or a reference picture identifier, and
  - (ii) at least one reference picture identifier, the reference picture identifier for the intra-coded reference picture being a positive non-zero integer;
- determining an indication for the common picture identifier associated with a plurality of non-reference pictures; and
- determining from the at least one reference picture identifier for a particular inter-coded picture all pictures referred to by said particular inter-coded picture.

19. The non-transitory computer readable storage medium according to claim 17, wherein said code, when executed by the processor, further causes the apparatus to perform:
- obtaining a request for random-accessing said particular inter-coded picture;
- decoding said all pictures referred to by said particular inter-coded picture; and
- decoding said particular inter-coded picture.

* * * * *